United States Patent
Shimmoto et al.

(10) Patent No.: US 11,778,137 B2
(45) Date of Patent: Oct. 3, 2023

(54) INFORMATION PROCESSING DEVICE, INFORMATION PROCESSING METHOD, AND NON-TRANSITORY RECORDING MEDIUM

(71) Applicants: Takafumi Shimmoto, Kanagawa (JP); Yoshinaga Kato, Kanagawa (JP)

(72) Inventors: Takafumi Shimmoto, Kanagawa (JP); Yoshinaga Kato, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/811,125

(22) Filed: Jul. 7, 2022

(65) Prior Publication Data
US 2023/0026956 A1  Jan. 26, 2023

(30) Foreign Application Priority Data

Jul. 26, 2021 (JP) .................... 2021-121273
Dec. 13, 2021 (JP) .................... 2021-201595

(51) Int. Cl.
| | |
|---|---|
| *H04N 5/77* | (2006.01) |
| *H04N 7/18* | (2006.01) |
| *H04N 23/661* | (2023.01) |
| *H04N 21/231* | (2011.01) |
| *H04N 21/258* | (2011.01) |
| *H04N 21/2743* | (2011.01) |
| *H04N 21/4223* | (2011.01) |

(Continued)

(52) U.S. Cl.
CPC ............ *H04N 5/77* (2013.01); *H04N 7/183* (2013.01); *H04N 23/661* (2023.01); *H04N 23/667* (2023.01)

(58) Field of Classification Search
None
See application file for complete search history.

(56) References Cited

U.S. PATENT DOCUMENTS

| | | | |
|---|---|---|---|
| 2009/0183091 A1* | 7/2009 | Sharpe | ................. G06F 16/435 715/764 |
| 2012/0140022 A1 | 6/2012 | Kato et al. | |
| 2014/0077937 A1 | 3/2014 | Kato et al. | |

(Continued)

FOREIGN PATENT DOCUMENTS

| | | |
|---|---|---|
| JP | 2005-260324 | 9/2005 |
| JP | 2007-043240 | 2/2007 |

(Continued)

OTHER PUBLICATIONS

Extended European Search Report for 22184598.5 dated Nov. 28, 2022.

*Primary Examiner* — Hung Q Dang
(74) *Attorney, Agent, or Firm* — IPUSA, PLLC

(57) ABSTRACT

An information processing device includes circuitry to set one or more images transmitted from an image capturing device and stored, in a memory, as ones to be deleted from the memory in a case that a condition is satisfied, transmit, to a communication terminal, input screen information related to an input screen for inputting information for setting one of the one or more images as one to be excluded from the images to be deleted, and set the one of the one or more images as the one to be excluded from the images to be deleted according to an operation received via the input screen displayed on the communication terminal based on the input screen information.

14 Claims, 26 Drawing Sheets

5003

| ACCOUNT ID: A0001 | | | | |
|---|---|---|---|---|
| IMAGE ID | TIME-LAPSE FLAG | DEVICE ID | IMAGE ACQUISITION TIME | DELETION EXCLUSION FLAG |
| P0035 | -- | -- | -- | -- |
| P0036 | -- | -- | -- | -- |
| P0356 | 1 | D02345 | 2021/6/20 9.10.15 | 0 |
| P0357 | 1 | D02345 | 2021/6/20 9.11.15 | 0 |
| P0358 | 1 | D02345 | 2021/6/20 9.12.15 | 0 |
| ... | ... | | ... | ... |

(51) Int. Cl.
*H04L 67/1097* (2022.01)
*H04N 23/667* (2023.01)

(56) References Cited

U.S. PATENT DOCUMENTS

| | | | | |
|---|---|---|---|---|
| 2015/0081344 | A1* | 3/2015 | Lee | G06Q 40/08 |
| | | | | 705/4 |
| 2015/0146026 | A1* | 5/2015 | Walker | G11B 27/34 |
| | | | | 348/211.2 |
| 2018/0095711 | A1 | 4/2018 | Kanda et al. | |
| 2019/0228625 | A1 | 7/2019 | Kvorning | |
| 2019/0235735 | A1 | 8/2019 | Toyota et al. | |
| 2020/0045176 | A1 | 2/2020 | Fujii et al. | |
| 2021/0099669 | A1* | 4/2021 | Shiro | H04N 7/04 |

FOREIGN PATENT DOCUMENTS

| | | |
|---|---|---|
| JP | 2008-084057 | 4/2008 |
| JP | 2013-074370 | 4/2013 |
| JP | 2014-168209 | 9/2014 |
| JP | 2015-037292 | 2/2015 |
| JP | 2016-131378 | 7/2016 |
| JP | 2017-103570 | 6/2017 |
| JP | 2018-106441 | 7/2018 |
| JP | 2019-134399 | 8/2019 |

\* cited by examiner

| ACCOUNT ID | MAXIMUM NUMBER OF STORED IMAGES | MAXIMUM NUMBER OF DEVICES |
|---|---|---|
| A0001 | 1000 | 20 |
| A0002 | 500 | 10 |
| A0003 | 1500 | 15 |
| ... | ... | ... |

ACCOUNT ID : A0001

| USAGE ID | USER ID OR DEVICE ID |
|---|---|
| 1 | R001234 |
| 2 | R005555 |
| 3 | D02345 |
| ... | ... |
| 20 | ... |

ACCOUNT ID : A0001

| IMAGE ID | TIME-LAPSE FLAG | DEVICE ID | IMAGE ACQUISITION TIME | DELETION EXCLUSION FLAG |
|---|---|---|---|---|
| P0035 | – | – | – | – |
| P0036 | – | – | – | – |
| P0356 | 1 | D02345 | 2021/6/20 9.10.15 | 0 |
| P0357 | 1 | D02345 | 2021/6/20 9.11.15 | 0 |
| P0358 | 1 | D02345 | 2021/6/20 9.12.15 | 0 |
| ... | ... | ... | ... | ... |

FIG. 18

| USAGE STATE 200 | |
|---|---|
| NUMBER OF MEMBERS | 201 — 14 (3 REMAIN) |
| [!] NUMBER OF LIVE VIEW DEVICES | 202 — 3 ([!] 3 REMAIN) |
| NUMBER OF IMAGES | 203 — 7 (993 REMAIN) |
| [!] NUMBER OF LOCKED LIVE VIEW IMAGES | 204 — 0 (993 REMAIN) |
| [!] LIVE VIEW | 206 |
| PLAN  205 | YEARLY SUBSCRIPTION PLAN |
| NUMBER OF MEMBERS: 20 / NUMBER OF IMAGES:1000 | |

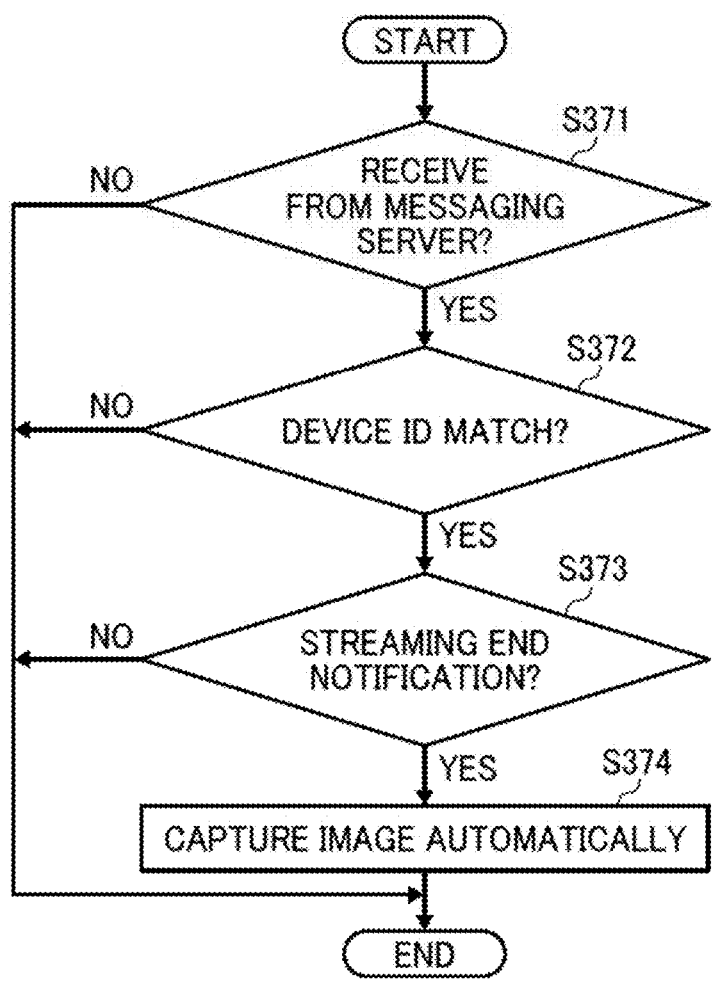

INFORMATION PROCESSING DEVICE, INFORMATION PROCESSING METHOD, AND NON-TRANSITORY RECORDING MEDIUM

CROSS-REFERENCE TO RELATED APPLICATIONS

This patent application is based on and claims priority pursuant to 35 U.S.C. § 119(a) to Japanese Patent Application Nos. 2021-121273, filed on Jul. 26, 2021, and 2021-201595, filed on Dec. 13, 2021, in the Japan Patent Office, the entire disclosures of which are hereby incorporated by reference.

BACKGROUND

Technical Field

Embodiments of the present disclosure relate to an information processing device, an information processing method, and a non-transitory recording medium.

Related Art

In recent years, with the spread of a cloud (cloud service, cloud computing), various services are available via a network. Such services are provided as, for example, Software as a Service (SaaS) and Platform as a service (PaaS).

An information processing system that includes an external service setting information storage unit to store settings for using an external service in association with a user, a transmission destination setting information storage unit to store transmission destination setting information in which the external service is set as a transmission destination of data in association with the user, an identification unit to identify one or more users, and a transmission unit to transmit data to a transmission destination of an external service based on the transmission destination setting information associated with each of the identified one or more users is known. The transmission destination of the external service varies for each of the one or more users. The information processing system having the above-described configuration can allow a user to reduce time and effort for selecting, in transmitting data related to an image to be displayed, an external service to be used as a transmission destination for each user in use settings.

SUMMARY

According to an aspect of the present disclosure includes an information processing device including circuitry to set one or more images transmitted from an image capturing device and stored, in a memory, as ones to be deleted from the memory in a case that a condition is satisfied, transmit, to a communication terminal, input screen information related to an input screen for inputting information for setting one of the one or more images as one to be excluded from the images to be deleted, and set the one of the one or more images as the one to be excluded from the images to be deleted according to an operation received via the input screen displayed on the communication terminal based on the input screen information.

According to an aspect of the present disclosure includes an information processing method including setting one or more images transmitted from an image capturing device and stored, in a memory, as ones to be deleted from the memory in a case that a condition is satisfied, transmitting, to a communication terminal, input screen information related to an input screen for inputting information for setting one of the one or more images as one to be excluded from the images to be deleted, and setting the one of the one or more images as the one to be excluded from the images to be deleted according to an operation received via the input screen displayed on the communication terminal based on the input screen information.

According to an aspect of the present disclosure includes a non-transitory recording medium storing a plurality of instructions which, when executed by one or more processors, causes the processors to perform a method. The method includes setting one or more images transmitted from an image capturing device and stored, in a memory, as ones to be deleted from the memory in a case that a condition is satisfied, transmitting, to a communication terminal, input screen information related to an input screen for inputting information for setting one of the one or more images as one to be excluded from the images to be deleted, and setting the one of the one or more images as the one to be excluded from the images to be deleted according to an operation received via the input screen displayed on the communication terminal based on the input screen information.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 6 is a conceptual diagram illustrating an example of an account management table according to the exemplary embodiment of the disclosure;

FIG. 7 is a conceptual diagram illustrating an example of a usage information management table according to the exemplary embodiment of the disclosure;

FIG. 8 is a conceptual diagram illustrating an example of an image information management table according to the exemplary embodiment of the disclosure;

FIG. 18 is a diagram illustrating an example of a confirmation screen according to the exemplary embodiment of the disclosure;

FIG. 31 is a flowchart illustrating another process performed by the image capturing device according to the third variation of the exemplary embodiment.

Figure 1:
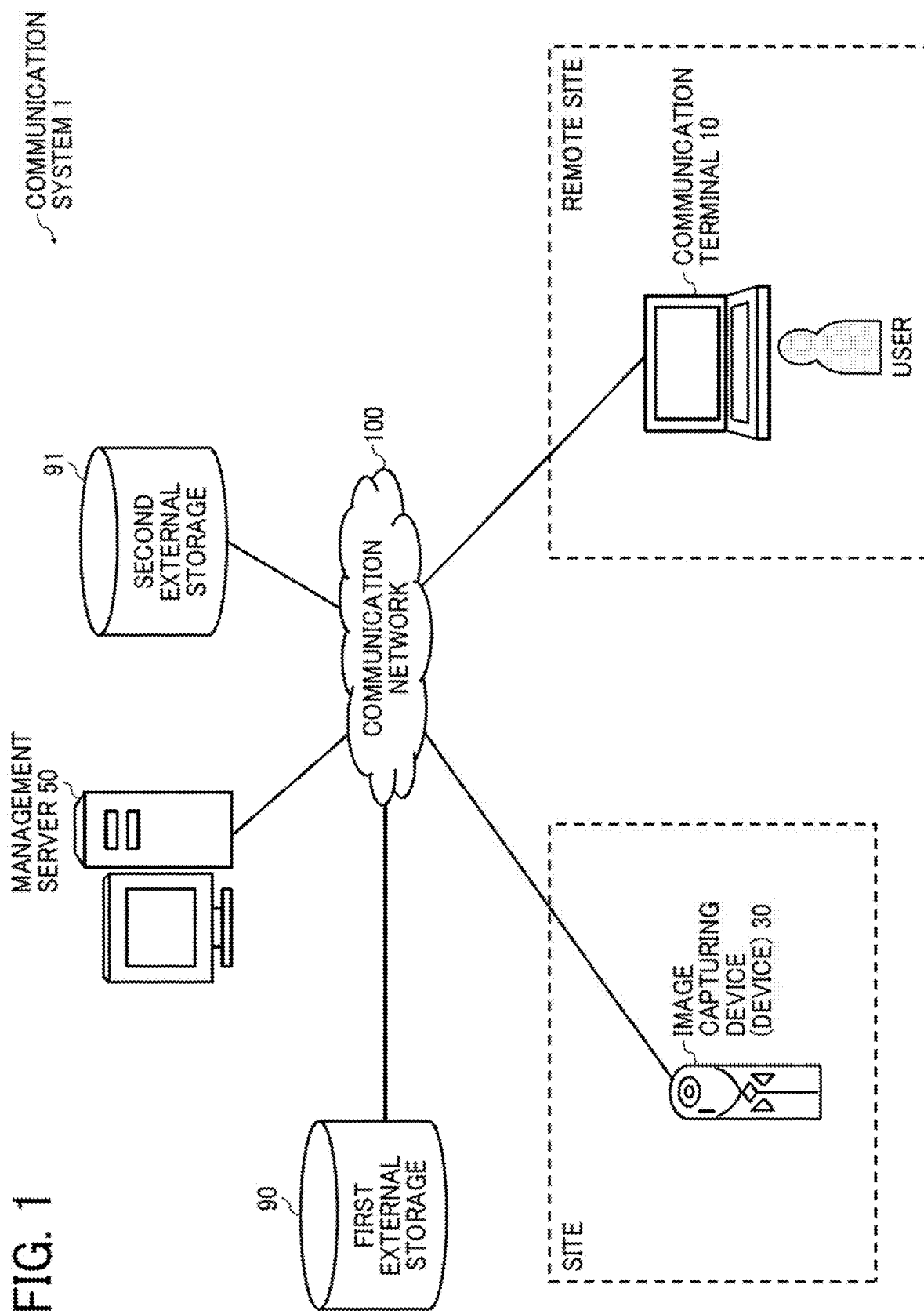
FIG. 1 is a diagram illustrating an example of an overall configuration of a communication system according to an exemplary embodiment of the disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Embodiments of the present disclosure are described below with reference to the attached drawings. In the description of the drawings, the same elements are denoted by the same reference numerals, and redundant descriptions thereof are omitted.

Embodiments: Overview of Communication System

Referring to FIG. 1, an overview of a communication system according to an embodiment is described below. FIG. 1 is a diagram illustrating an example of an overall configuration of a communication system 1 according to the present embodiment. The communication system 1 illustrated in FIG. 1 is a system in which a captured image such as a video image distributed from a distribution site that is a remote site is displayed at a browsing site by participating in a predetermined service such as a remote communication provided by a management server 50, and thereby a state of the distribution site is viewable in real time. The browsing site, which may be referred to as a viewer site, is a site where a user who views the image resides.

In the description of embodiments, an example of the predetermined service includes an interval shooting mode (also referred to as a time-lapse image capturing mode in the description of embodiments). In addition, examples of the predetermined event include a remote conference, a remote class, a remote medical examination, a meeting or consultation, inspection for a remote site, monitoring for a remote site, and patrol for a remote site each of which is implemented by communication between remote sites via the management server 50.

The time-lapse image capturing mode is a mode in which a plurality of images is continuously captured under predetermined image capturing conditions (including, for example, an interval of image capturing, the number of image capturing times, and an image capturing period (start time/end time of image capturing)). A time-lapse service is a service for sharing a plurality of images captured in the time-lapse image capturing mode.

The time-lapse service may have a time-lapse moving image function for generating a moving image using the plurality of images captured in the time-lapse image capturing mode. The time-lapse moving image function is a function of generating a moving image by joining a plurality of images captured at constant image capturing intervals under predetermined image capturing conditions. When the moving image is reproduced at a normal speed (1× speed), the moving image with a fast time lapse such as a fast-forward moving image is viewable. The time-lapse moving image function allows a user at a browsing site to view or browse a state of (situation in) a distribution site as a fast-forward moving image, and thereby the user easily and quickly get the picture of changes of the state at the site (distribution site) with elapse of time.

As illustrated in FIG. 1, the communication system 1 is an example of an information processing system, and includes a communication terminal 10 placed at a browsing site, an image capturing device 30 placed at a site that is a distribution site, and a management server 50. The communication terminal 10, the image capturing device 30, and the management server 50 included in the communication system 1 are communicably connected with each other via a communication network 100. The communication network 100 includes the Internet, a mobile communication network, and a local area network (LAN), for example. The communication network 100 includes a network by not only wired communications but also a network by wireless communications such as 3rd generation (3G), 4th generation (4G), 5th generation (5G), WIRELESS FIDELITY (Wi-Fi) (registered trademark), Worldwide Interoperability for Microwave Access (WiMAX), or Long Term Evolution (LTE).

The communication terminal 10 is a computer such as a laptop personal computer (PC), a smartphone, or a tablet terminal, used by a user at the browsing site.

For example, the communication terminal 10 participates in a predetermined service provided by the management server 50 after user authentication performed by the management server 50. The communication terminal 10 displays a captured image captured by the image capturing device 30 installed at the distribution site, and allows the user to browse a state of the distribution site.

The communication terminal 10 is not limited to a laptop PC, a smartphone, or a tablet terminal, and may be, for example, a desktop PC, a wearable terminal, a head mount display (HMD), or an interactive white board (IWB: an electronic whiteboard having mutual communication capability).

The image capturing device 30 is a device that is installed at the distribution site that is a site such as an office or a factory and participates in the predetermined service provided by the management server 50. The image capturing device 30 is registered in advance with the management server 50. When a service is started in response to a request from a user, the image capturing device 30 activates an installed application and participates in the service as a participant. The image capturing device 30 captures an image of an object or surroundings such as scenery in the distribution site to obtain as a captured image, and transmits the captured image to the communication terminal 10 participating in the service via the management server 50. The captured image obtained by the image capturing device 30 may be a video image (moving image) or a still image, or may include both of a video image and a still image. Further, the captured image may be provided with audio.

The image capturing device 30 is an example of a device that participates in a service provided by the management server 50. The device participating in a service is not limited to an image capturing device, and may be a videoconference terminal, an IWB, or a mobile apparatus such as a robot that moves around within a distribution site.

The image capturing device 30 is an example of a measurement device and acquires a captured image that is an example of measurement data acquired by the measurement device. The distribution site where the image capturing device 30 is installed is not limited to an office and a factory, and may be, for example, an outdoor site such as a business facility, a construction/building site, a substation, a farmstead, a field, an agricultural farm, a cultivated land, a street, an intersection, or a disaster site, or an indoor site such as a school, a warehouse, a commercial facility, a hospital, a real estate, or a nursing facility. In other words, the distribution site where the image capturing device 30 is installed may be any site where a user desires to execute a service such as a remote conference or a remote inspection from a browsing site. The communication system 1 may include a plurality of image capturing devices 30, as described later.

The management server 50 is an example of information processing device, a server computer that provides and manages services executed between the communication terminal 10 and the image capturing device 30. The management server 50 manages and controls communication between the communication terminal 10 and the image capturing device 30, and relays image data to be transmitted or received. The management server 50 also cooperates with an external storage service that provides first external storage 90 and second external storage 91, and stores access information for accessing the first external storage 90 and the second external storage 91. In the description of embodiments, the first external storage 90 and the second external storage 91 are an example of a storage unit that stores an image that is an example of data, the first external storage 90 is an example of a first storage unit, and the second external storage 91 is an example of a second storage unit.

The management server 50 may be implemented by a plurality of computers in manner that the functions of the management server 50 are distributed among the plurality of computers. The management server 50 is described as a server computer residing on a cloud network, but the management server 50 may be a server residing on an on-premises network.

Each of the first external storage 90 and the second external storage 91 is a storage service (or online storage) provided by an external providing service via the communication network 100. Each of the first external storage 90 and the second external storage 91 is, for example, a storage location for storing a data file on a cloud, and a user who has a contract to use an external storage service may store and browse data.

Figure 2:
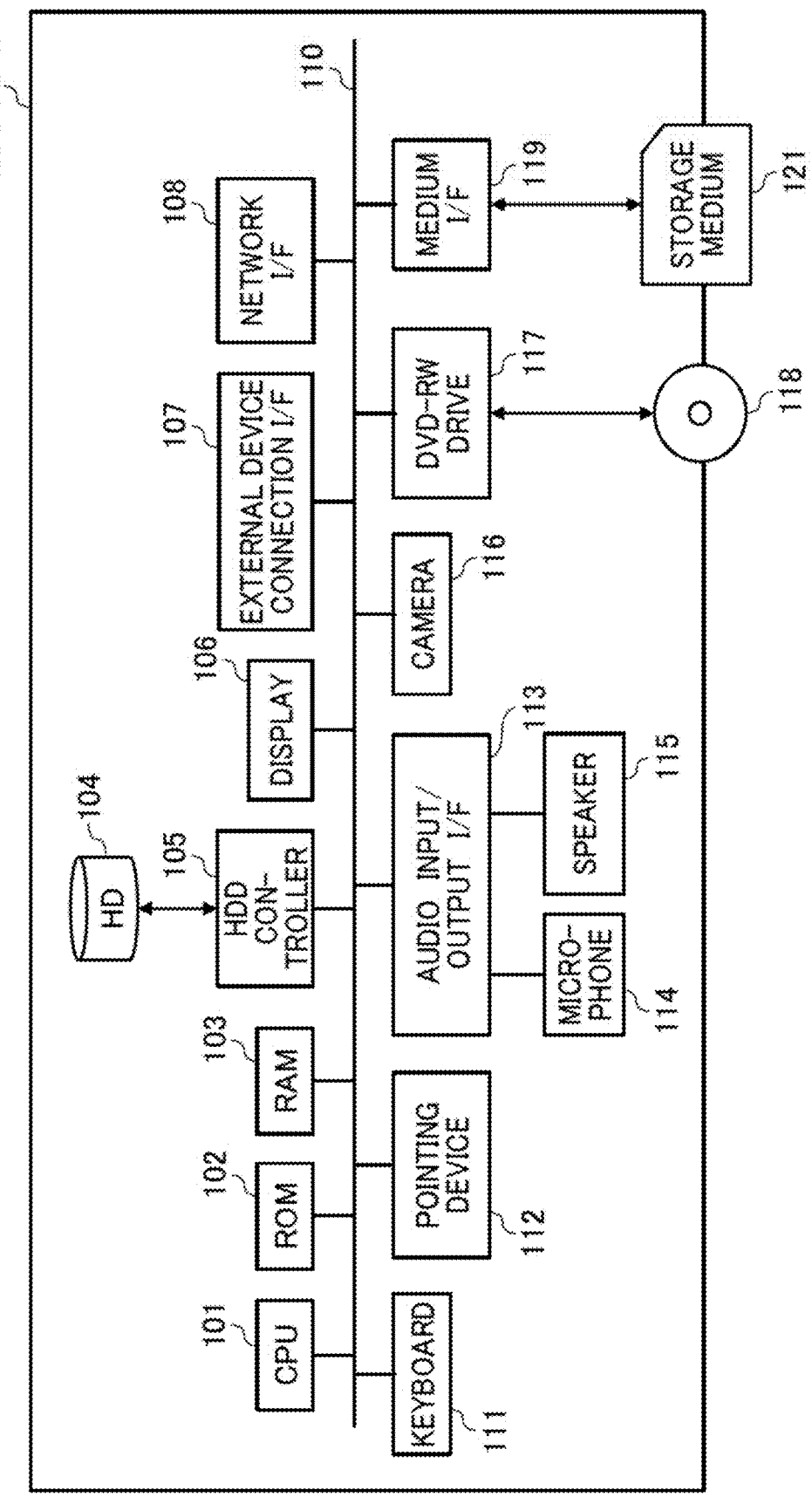
FIG. 2 is a block diagram illustrating an example of a hardware configuration of a communication terminal according to the exemplary embodiment of the disclosure.
Figure 3:
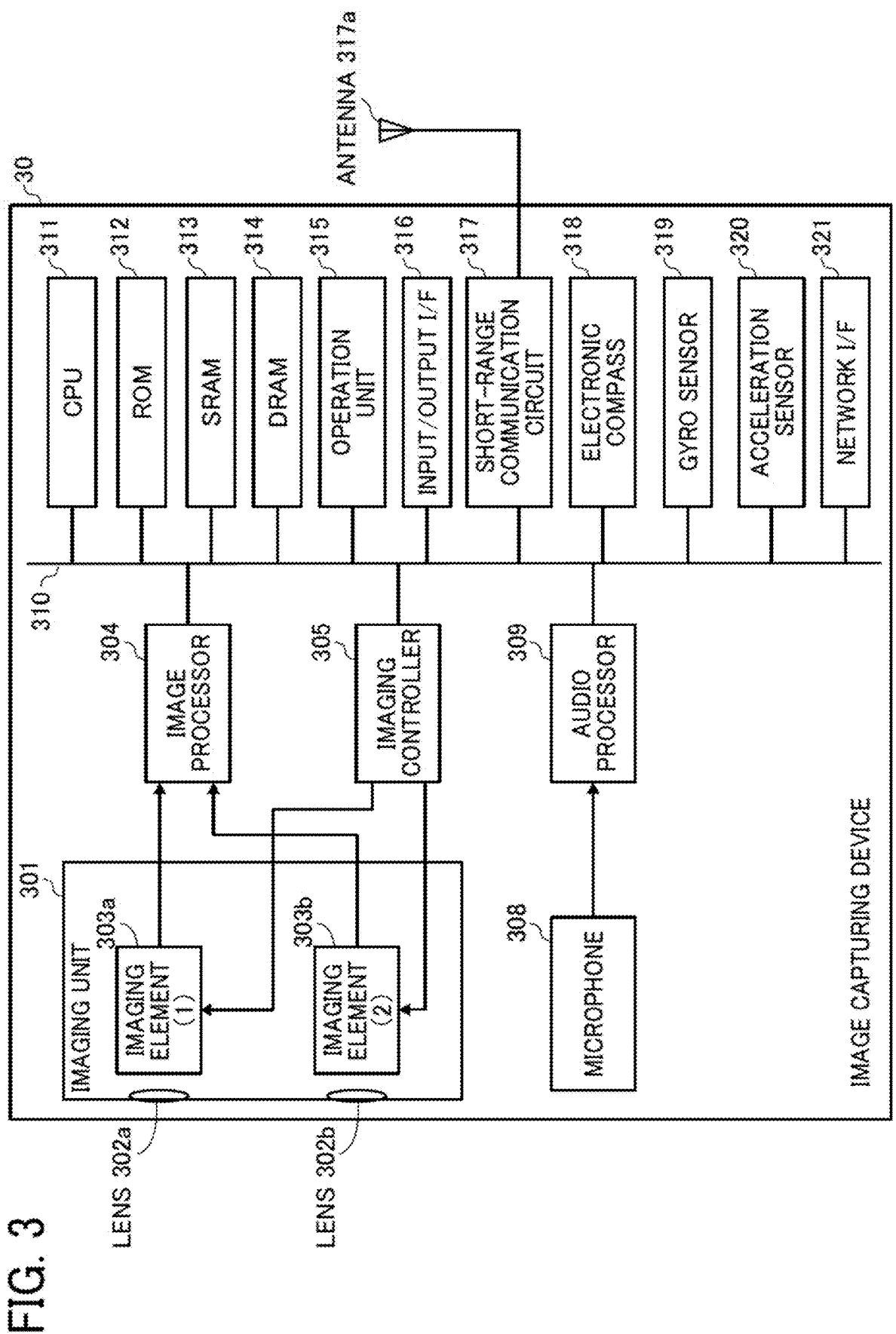
FIG. 3 is a block diagram illustrating an example of a hardware configuration of an image capturing device according to the exemplary embodiment of the disclosure.
Figure 4:
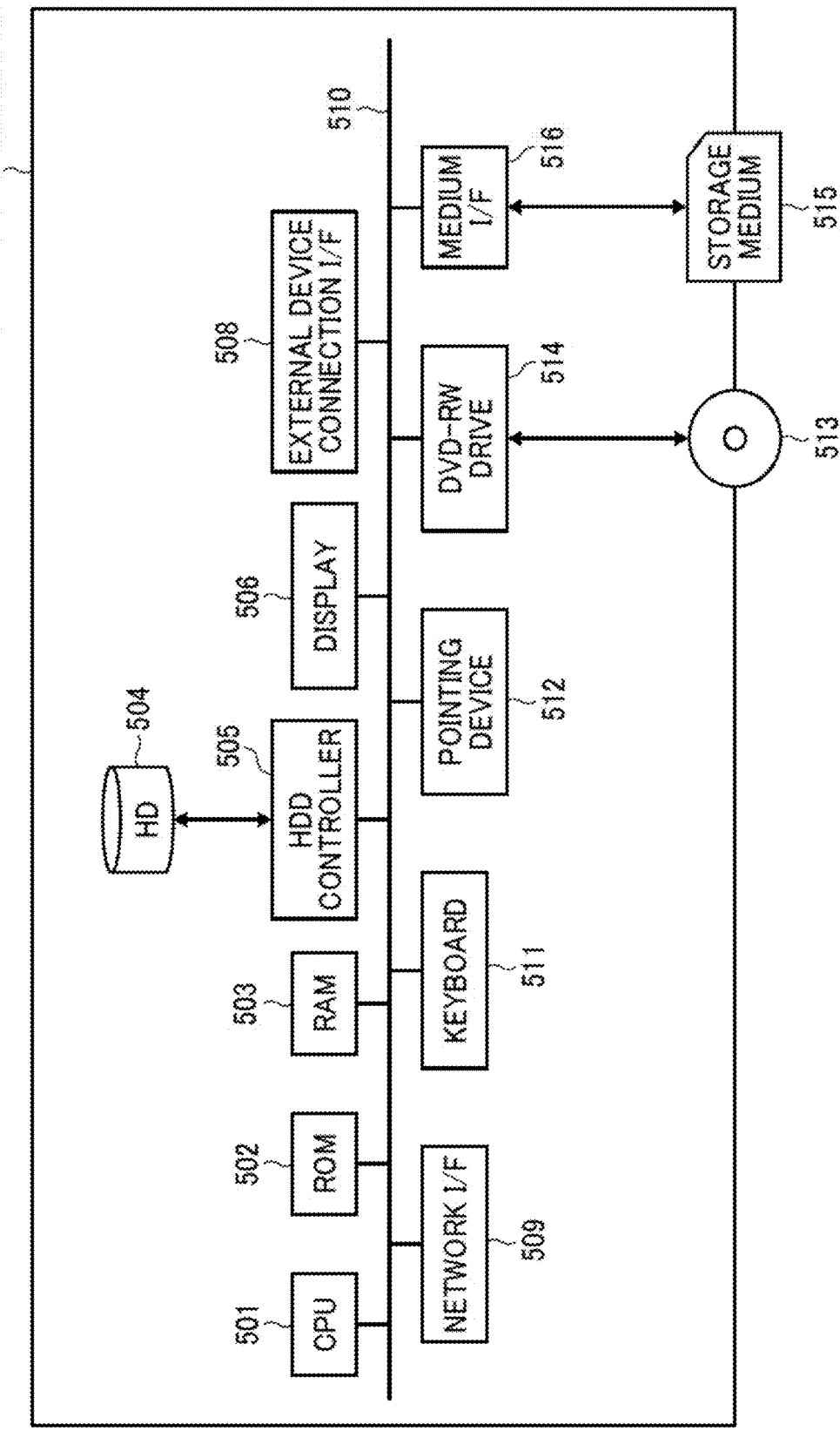
FIG. 4 is a block diagram illustrating an example of a hardware configuration of a management server according to the exemplary embodiment of the disclosure.

Hardware Configuration:

Referring to FIG. 2 to FIG. 4, hardware configurations of each apparatus, device, and terminal of the communication system 1 according to the present embodiment are described below. In the hardware configurations illustrated in FIG. 2 to FIG. 4, certain hardware elements may be added or omitted as appropriate.

Hardware Configuration of Communication Terminal:

A hardware configuration of the communication terminal 10 according to the present embodiment is described with reference to FIG. 2. FIG. 2 is a block diagram illustrating an example of a hardware configuration of the communication terminal 10. The communication terminal 10 is implemented by a computer, and as illustrated in FIG. 2, includes a central processing unit (CPU) 101, a read only memory (ROM) 102, a random access memory (RAM) 103, a hard disk (HD) 104, a hard disk drive (HDD) controller 105, a display 106, an external device connection interface (I/F) 107, a network I/F 108, a bus line 110, a keyboard 111, a pointing device 112, an audio input/output I/F 113, a microphone 114, a speaker 115, a camera 116, a digital versatile disc rewritable (DVD-RW) drive 117 and a medium I/F 119.

The CPU 101 controls entire operation of the communication terminal 10. The ROM 102 stores a program used for driving the CPU 101, such as an initial program loader (IPL). The RAM 103 is used as a work area for the CPU 101. The HD 104 stores various data such as a program. The HDD controller 105 controls reading or writing of various data from or to the HD 104 under control of the CPU 101. The display 106 is an example of a display device (display unit) that displays various types of information such as a cursor, a menu, a window, characters, or an image. In one example, the display 106 is a touch panel display provided with an input device (input unit). The external device connection I/F 107 is an interface for connecting various external devices. The network I/F 108 is an interface for performing data communication using the communication network 100. The bus line 110 is, for example, an address bus or a data bus, which electrically connects the elements such as the CPU 101 illustrated in FIG. 2.

The keyboard 111 is one example of an input device provided with a plurality of keys for allowing a user to input characters, numerals, or various instructions. The pointing device 112 is an example of an input device that allows a user to select or execute a specific instruction, select processing to be executed, or move a cursor being displayed. The keyboard 111 and the pointing device 112 are merely examples of the input device. As another example of the input device, a touch panel or a voice input device may be used. The audio input/output I/F 113 is a circuit for inputting or outputting an audio signal between the microphone 114 and the speaker 115 under control of the CPU 101. The microphone 114 is an example of a built-in audio collecting unit to input audio. The speaker 115 is an example of a built-in output unit to output an audio signal. The camera 116 is an example of an image capturing unit, which is a built-in type, to capture an image of an object to obtain image data. Note that the microphone 114, the speaker 115, or the camera 116 may be an external device in alternative to the built-in device of the communication terminal 10. The DVD-RW drive 117 controls reading or writing of various data to or from a DVD-RW 118, which is an example of a removable recording medium. The removable recording medium is not limited to the DVD-RW and may be a digital versatile disk-recordable (DVD-R), or a BLU-RAY (registered trademark) disc (BLU-RAY disk), for example. The medium I/F 119 controls reading or writing (storing) of data from or to a storage medium (recording medium) 121 such as a flash memory.

Hardware Configuration of Image Capturing Device:

Referring to FIG. 3, a hardware configuration of the image capturing device 30 according to the present embodiment is described below. FIG. 3 is a block diagram illustrating an example of a hardware configuration of the image capturing device 30. In FIG. 3, as an example of the image capturing device 30, a spherical image capturing device that acquires a spherical image by capturing an image of an object or surroundings such as scenery is illustrated. In some embodiments, the image capturing device 30 is a general-purpose digital camera or a camera of a smartphone that acquires a general planar image. In some embodiments, the image capturing device 30 is a wide-angle camera that acquires a wide-angle image having an angle of view equal to or larger than a predetermined value. In the following description of embodiments, the image capturing device 30 that is a spherical (omnidirectional) image capturing device having two imaging elements is used. However, the image capturing device 30 may have more than two imaging elements. In addition, the image capturing device 30 is not necessarily an image capturing device dedicated to omnidirectional image capturing. Alternatively, an external omnidirectional image capturing unit may be attached to a general-purpose digital camera or a smartphone to implement an image capturing device having substantially the same function as that of the image capturing device 30 according to the present embodiment.

As illustrated in FIG. 3, the image capturing device 30 includes an imaging unit 301, an image processor 304, an imaging controller 305, a microphone 308, an audio processor 309, a CPU 311, a ROM 312, a static random access memory (SRAM) 313, a dynamic random access memory (DRAM) 314, an operation unit 315, an input/output I/F 316, a short-range communication circuit 317, an antenna 317a for the short-range communication circuit 317, an electronic compass 318, a gyro sensor 319, an acceleration sensor 320, and a network I/F 321.

The imaging unit 301 includes two wide-angle lenses (so-called fish-eye lenses) 302a and 302b (collectively referred to as lens 302 when not distinguished from each other), each having an angle of view of equal to or greater than 180 degrees so as to form a hemispherical image. The imaging unit 301 further includes two imaging elements 303a and 303b corresponding to the lenses 302a and 302b respectively. The imaging elements 303a and 303b each includes an imaging sensor such as a complementary metal oxide semiconductor (CMOS) sensor and a charge-coupled device (CCD) sensor, a timing generation circuit, and a group of registers. The imaging sensor converts an optical image formed by the lenses 302a and 302b into electric signals to output image data. The timing generation circuit generates horizontal or vertical synchronization signals, pixel clocks and the like for the imaging sensor. Various commands, parameters, and the like for operations of the imaging elements 303a and 303b are set in the group of registers.

Each of the imaging elements 303a and 303b of the imaging unit 301 is connected to the image processor 304 via a parallel I/F bus. In addition, each of the imaging elements 303a and 303b of the imaging unit 301 is connected to the imaging controller 305 via a serial I/F bus such as an Inter Integrated Circuit (I2C) bus. The image processor 304, the imaging controller 305, and the audio processor 309 are each connected to the CPU 311 via a bus 310. Furthermore, the ROM 312, the SRAM 313, the DRAM 314, the operation unit 315, the input/output I/F 316, the short-range communication circuit 317, the electronic compass 318, the gyro sensor 319, the acceleration sensor 320, and the network I/F 321 are also connected to the bus 310.

The image processor 304 acquires image data from each of the imaging elements 303a and 303b via the parallel I/F bus and performs predetermined processing on each image data. After that, the image processor 304 combines these image data to generate data of an equirectangular projection image.

The imaging controller 305 usually functions as a master device while each of the imaging elements 303a and 303b usually functions as a slave device. The imaging controller 305 sets commands or the like in the group of registers of each of the imaging elements 303a and 303b via the I2C bus. The imaging controller 305 receives various commands from the CPU 311. In addition, the image controller 305 obtains status data of the group of registers of each of the imaging elements 303a and 303b through the I2C bus and transmits the status data to the CPU 311.

The imaging controller 305 instructs the imaging elements 303a and 303b to output the image data at a time when the shutter button of the operation unit 315 is pressed. In some cases, the image capturing device 30 displays a preview image on a display (e.g., a display of an external terminal such as a smartphone that performs short-range communication with the image capturing device 30 through the short-range communication circuit 317) or displays a moving image (video image, movie). In case of displaying movie, image data are continuously output from the imaging elements 303a and 303b at a predetermined frame rate (frames per minute).

Furthermore, the imaging controller 305 functions as a synchronization control unit to operate in cooperation with the CPU 311, to synchronize the time when the imaging element 303a outputs image data and the time when the imaging element 303b outputs the image data. In the present embodiment, the image capturing device 30 does not include a display unit (display). However, in some embodiments, the image capturing device 30 may include a display. The microphone 308 converts sound into audio data (signals).

The audio processor 309 obtains audio data output from the microphone 308 via an I/F bus and performs predetermined processing on the audio data.

The CPU 311 controls entire operation of the image capturing device 30, for example, by performing predetermined processing.

The ROM 312 stores various programs for execution by the CPU 311. Each of the SRAM 313 and the DRAM 314 operates as a work memory to store programs for execution by the CPU 311 or data in current processing. More specifically, in one example, the DRAM 314 stores image data currently processed by the image processor 304 and data of the equirectangular projection image on which processing has been performed.

The operation unit 315 collectively refers to various operation keys, a power switch, the shutter button, and a touch panel having functions of both displaying information and receiving input from a user, which can be used in combination. The user operates the operation unit 315 to input various image capturing modes or image capturing conditions.

The input/output I/F 316 collectively refers to an interface circuit such as a universal serial bus (USB) I/F with an external medium such as a secure digital (SD) card or an external personal computer. The input/output I/F 316 supports at least one of wired and wireless communications. The data of the equirectangular projection image, which is stored in the DRAM 314, is stored in the external medium via the input/output I/F 316 or transmitted to an external terminal (apparatus) via the input/output I/F 316, as appropriate.

The short-range communication circuit 317 communicates data with the external terminal (apparatus) via the antenna 317a of the image capturing device 30 by short-range wireless communication such as near field communication (NFC), BLUETOOTH (registered trademark), and Wi-Fi. The short-range communication circuit 317 transmits the data of equirectangular projection image to an external terminal (apparatus).

The electronic compass 318 calculates an orientation of the image capturing device 30 from the Earth's magnetism to output orientation information. This orientation and tilt information is an example of related information, which is metadata described in compliance with Exif. This information is used for image processing such as image correction of captured images. The related information also includes a date and time when the image is captured, and a data size of the image data. The gyro sensor 319 detects a change in tilt of the image capturing device 30 (roll, pitch, yaw) with movement of the image capturing device 30. The change in angle is one example of related information (metadata) described in compliance with Exif. This information is used for image processing such as image correction of captured images. The acceleration sensor 320 detects acceleration in three axial directions. The image capturing device 30 calculates a position (an angle with respect to the vertical direction) of the image capturing device 30, based on an angular velocity or an acceleration detected by the gyro sensor 319 or the acceleration sensor 320. With the gyro sensor 319 and the acceleration sensor 320, the image capturing device 30 corrects tilt of image with high accuracy.

For example, the image capturing device 30 includes a zenith correction unit that performs zenith correction on a spherical image in a manner that the zenith direction of the spherical image is the same as or almost the same as the vertical direction, and an anti-shake correction unit that corrects in relation to a camera shake, and execution of the zenith correction or the anti-shake correction is performable based on the angular velocity or the acceleration to improve accuracy. The image processor 304 may include the zenith correction unit and the anti-shake correction unit. The network I/F 321 is an interface for performing data communication, via such as a router, using the communication network 100 such as the Internet.

Hardware Configuration of Management Server:

Referring to FIG. 4, a hardware configuration of the management server 50 according to the present embodiment is described below. FIG. 4 is a block diagram illustrating an example of a hardware configuration of the management server 50. Each of the elements of hardware configuration of the management server 50 is denoted by a reference numeral in 500 series. The management server 50 is implemented by a computer, and as illustrated in FIG. 4, includes a CPU 501, a ROM 502, a RAM 503, an HD 504, an HDD controller 505, a display 506, an external device connection I/F 508, a network I/F 509, a bus line 510, a keyboard 511, a pointing device 512, a DVD-RW drive 514, and a medium I/F 516.

The CPU 501 controls entire operation of the management server 50. The ROM 502 stores programs such as an initial program loader (IPL) to boot the CPU 501. The RAM 503 is used as a work area for the CPU 501. The HD 504 stores various data such as a program. The HDD controller 505 controls reading or writing of various data to or from the HD 504 under control of the CPU 501. The display 506 displays various information such as a cursor, menu, window, characters, or image. In one example, the display 506 is a touch panel display provided with an input device (input unit). The external device connection I/F 508 is an interface for connecting various external devices. The network I/F 509 is an interface that controls communication of data with an external device through the communication network 100. The bus line 510 is, for example, an address bus or a data bus, which electrically connects the elements such as the CPU 501 illustrated in FIG. 4.

The keyboard 511 is an example of an input device including a plurality of keys for inputting characters, numerical values, various instructions, and the like. The pointing device 512 is an example of an input device that allows a user to select or execute a specific instruction, select a target for processing, or move a cursor being displayed. The input device (input unit) is not limited to the keyboard 511 and the pointing device 512, and may be a touch panel, a voice input device, or the like. The DVD-RW drive 514 controls reading or writing of various data to or from a DVD-RW 513, which is an example of a removable recording medium. The removable recording medium is not limited to the DVD-RW and may be a DVD-R, or a BLU-RAY (registered trademark) disc (BLU-RAY disk), for example. The medium I/F 516 controls reading or writing (storing) of data from or to a storage medium (recording medium) 515 such as a flash memory.

Each of the above-described control programs may be recorded in a file in a format installable or executable on a computer-readable recording medium for distribution. Examples of the recording medium include a Compact Disc Recordable (CD-R), a DVD, a BLU-RAY Disc, an SD card, and a USB memory. In addition, such recording medium may be provided in the form of a program product to users within a certain country or outside that country. For example, the management server 50 implements a method according to the present disclosure by executing a program according to the present disclosure.

Figure 5:
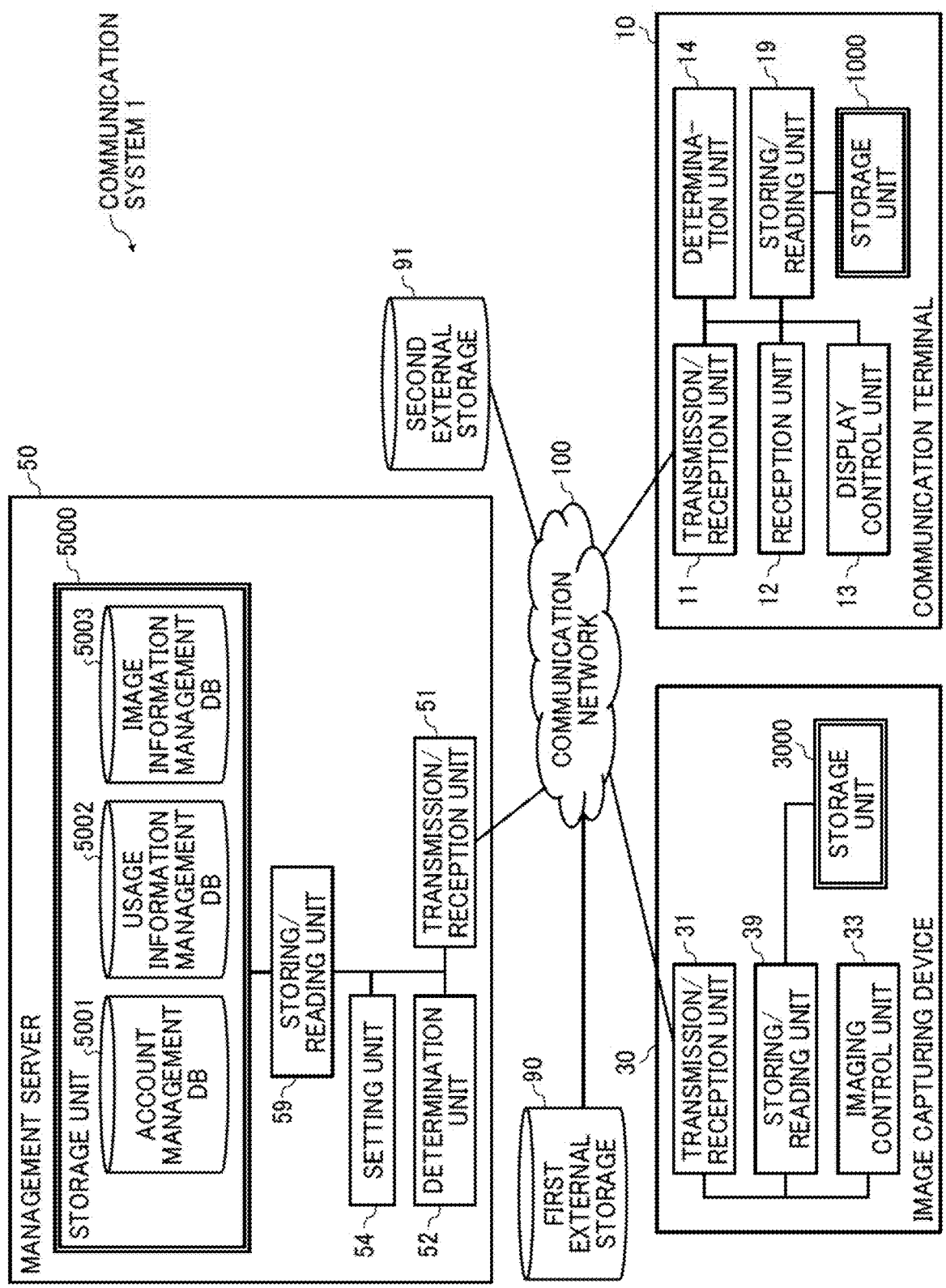
FIG. 5 is a block diagram illustrating an example of a functional configuration of the communication system according to the exemplary embodiment of the disclosure.

Functional Configuration:

Referring to FIG. 5 to FIG. 8, a functional configuration of the communication system 1 according to the present embodiment is described below. FIG. 5 is a block diagram illustrating an example of a functional configuration of the communication system 1 according to the present embodiment. Note that FIG. 5 illustrates devices or terminals that are illustrated in FIG. 1 and related to processing or operation described below.

Functional Configuration of Communication Terminal:

Referring to FIG. 5, a functional configuration of the communication terminal 10 according to the present embodiment is described below. The communication terminal 10 includes a transmission/reception unit 11, a reception unit 12, a display control unit 13, a determination unit 14, and a storing/reading unit 19. Each of these units is a function that is implemented by operating any of the elements illustrated in FIG. 2 with instructions from the CPU 101 according to the control program for a communication terminal expanded from the HD 104 to the RAM 103. The communication terminal 10 further includes a storage unit 1000 that is implemented by the ROM 102, the HD 104, or the storage medium 121 illustrated in FIG. 2.

The transmission/reception unit 11 is mainly implemented by processing of the CPU 101 in relation to the network I/F 108 and transmits or receives various data or information to or from other devices or terminals through the communication network 100.

The reception unit 12 is implemented mainly by processing of the CPU 101 and the keyboard 111 or the pointing devices 112 and receives various selections or inputs from users.

The display control unit 13 is implemented mainly by processing of the CPU 101 and causes the display 106 to display various screens by accessing the management server 50 using a web browser. Specifically, for example, the display control unit 13 starts and executes an application or a browser installed on the communication terminal 10 to access the management server 50.

Then, the display control unit 13 downloads, for example, Web Application (WebAPP) that includes at least Hyper Text Markup Language (HTML) and further includes Cascading Style Sheets (CSS) or JAVA SCRIPT (registered trademark), and causes the display 106 to display various image data generated using the WebAPP. For example, the display control unit 13 causes the display 106 to display image data generated by HTML5 that includes data in a format of Extensible Markup Language (XML), JavaScript Object Notation (JSON), or Simple Object Access Protocol (SOAP).

The determination unit 14 is implemented by processing of the CPU 101 and executes various determinations. The storing/reading unit 19 is implemented mainly by processing of the CPU 101 and stores various types of data (or information) in the storage unit 1000 or reads various types of data (or information) from the storage unit 1000.

Functional Configuration of Image Capturing Device:

Referring to FIG. 5, a functional configuration of the image capturing device 30 according to the present embodiment is described below. The image capturing device 30 includes a transmission/reception unit 31, an imaging control unit 33, and a storing/reading unit 39. Each of these units is a function that is implemented by operating any of the elements illustrated in FIG. 3 with instructions from the CPU 311 according to the control program for an image capturing device expanded from the SRAM 313 to the DRAM 314. The image capturing device 30 further includes a storage unit 3000 that is implemented by the ROM 312, the SRAM 313, or the DRAM 314 illustrated in FIG. 3. The storage unit 3000 stores a Globally Unique Identifier (GUID) identifying the own device.

The transmission/reception unit 31 is mainly implemented by processing of the CPU 311 and transmits or receives various data or information to or from other devices or terminals. The transmission/reception unit 31 communicates data with other devices or terminals through the communication network 100 via the network I/F 321.

The imaging control unit 33 is mainly implemented by the imaging unit 301, the image processor 304, and the imaging controller 305 each operating according to the instructions of the CPU 311. The imaging control unit 33 captures an image of the object or surroundings (for example, scenery) to obtain captured image data.

The storing/reading unit 39 is implemented mainly by processing of the CPU 311 and stores various types of data (or information) in the storage unit 3000 or reads various types of data (or information) from the storage unit 3000. In addition, in the storage unit 3000, captured image data acquired by the imaging control unit 33 performing image capturing processing. The captured image data stored in the storage unit 3000 is associated with an image capturing time of the captured image as metadata.

Functional Configuration of Management Server:

Referring to FIG. 5, a functional configuration of the management server 50 according to the present embodiment is described below. The management server 50 includes a transmission/reception unit 51, a determination unit 52, a setting unit 54, and a storing/reading unit 59. Each of these units is a function that is implemented by operating any of the elements illustrated in FIG. 4 with instructions from the CPU 501 according to the control program for a management server expanded from the HD 504 to the RAM 503. The management server 50 further includes a storage unit 5000 that is implemented by the ROM 502, the HD 504, or the storage medium 515 illustrated in FIG. 4.

The transmission/reception unit 51 is mainly implemented by processing of the CPU 501 in relation to the network I/F 509 and transmits or receives various data or information to or from other devices or terminals through the communication network 100.

The determination unit 52 is implemented by processing of the CPU 501 and performs various determinations. The setting unit 54 is implemented by processing of the CPU 501 and sets for various settings.

The storing/reading unit 59 is implemented mainly by processing of the CPU 501 and stores various types of data (or information) in the storage unit 5000 or reads various types of data (or information) from the storage unit 5000.

Note that the storage unit 5000 may be configured as a storage device external to the management server 50.

Account Management Table:

FIG. 6 is a conceptual diagram illustrating an example of an account management table according to the present embodiment. The storage unit 5000 includes an account management database (DB) 5001 including the account management table as illustrated in FIG. 6.

With the account management table, account information (account identification information (ID)) for identifying an account managed by the management server 50, the maximum number of images that can be stored in the first external storage 90 and the second external storage 91, and the maximum number of devices that can use a service provided by the management server 50 are managed. In the description of embodiments, the maximum number of images that can be stored may be simply referred to as the maximum number of stored images, and the maximum number of devices that can use a service may be simply referred to as the maximum number of devices. In the account management table, the maximum number of images that can be stored (the maximum number of stored images) and the maximum number of devices that can use a service (the maximum number of devices) are stored in association with each other for each account.

In an infrastructure maintenance site or a construction (building) site, for example, operation performed in a site or a state or a situation of a site may be managed over a long period of time.

In recent years, services including Software as a Service (SaaS) and Platform as a Service (PaaS) have been provided as cloud services.

In the present embodiment, a cloud service for saving and sharing an image can be suitably performed. Various types of contracts for using such a cloud service can be offered. For example, "the maximum number of images that can be saved (stored)," "the maximum storage capacity that can store still images and video images (moving images)," and "the maximum number of users (the maximum number of devices) that can use the service," can be set.

The flat-rate usage fee may be determined according to usage conditions such as the maximum number of images that can be stored, the maximum storage capacity, and the maximum number of users (the maximum number of devices). As for the flat-rate usage fee, a subscription method of charging a usage fee for a right to use a service may be used, for example.

For example, in a case where time-lapse image capturing is performed at a building site, and captured images are sequentially stored, "the maximum number of images that can be stored" and "the maximum storage capacity for storing," which are usage conditions defined in a usage contract may be exceeded.

Specifically, for example, in a case where image capturing conditions for the time-lapse image capturing are set to "image capturing interval of 10 minutes and image capturing period of 10 days," the number of images to be captured and stored reaches 1440. With this image capturing conditions, when a usage condition of "the maximum number of images that can be stored" indicates 1000 sheets, the upper limit of the storage condition is exceeded by the time-lapse image capturing alone.

In such a case, a captured image obtained by image capturing other than time-lapse image capturing (namely, normal (standard) image capturing) cannot be stored. To deal with this, the user may delete saved images to increase the number of remaining space for images to be stored in the maximum number of stored images, or reconsider the usage contract to change the contract to have a plan in which more images can be saved. Such inconvenience may cause a user to hesitate to use time-lapse image capturing function.

According to some embodiments, an information processing device, an information processing method, an information processing program, and an information processing system that can appropriately delete and store data are provided.

Usage Information Management Table:

FIG. 7 is a conceptual diagram illustrating an example of a usage information management table. With the usage information management table, a user that can use the time-lapse service provided by the management server 50 or a device such as the image capturing device 30 are managed. The storage unit 5000 includes a usage information management DB 5002 including the usage information management table as illustrated in FIG. 7.

With the usage information management table, a usage ID, and a user identification information (user ID) or a device identification information (device ID (model ID)) are managed in association with each other for each account information (account ID). The number of usage IDs to be set for each account is equal to the number of devices that can use a service for the corresponding account managed in the account management DB 5001 illustrated in FIG. 6.

Image Information Management Table:

FIG. 8 is a conceptual diagram illustrating an example of an image information management table. With the image management table, images stored in the first external storage 90 or the second external storage 91 are managed. The storage unit 5000 includes an image information management DB 5003 including the image information management table as illustrated in FIG. 8.

With the image information management table, image identification information (image ID) for identifying an image stored in the first external storage 90 or the second external storage 91, a time-lapse flag indicating whether the time-lapse service is used, device identification information (device ID) registered for using the time-lapse service, an image acquisition time indicating a time and date at which an image is captured by time-lapse image capturing, and a deletion exclusion flag indicating that an image captured by time-lapse image capturing is excluded from ones to be deleted are managed in association with each other.

Figure 9:
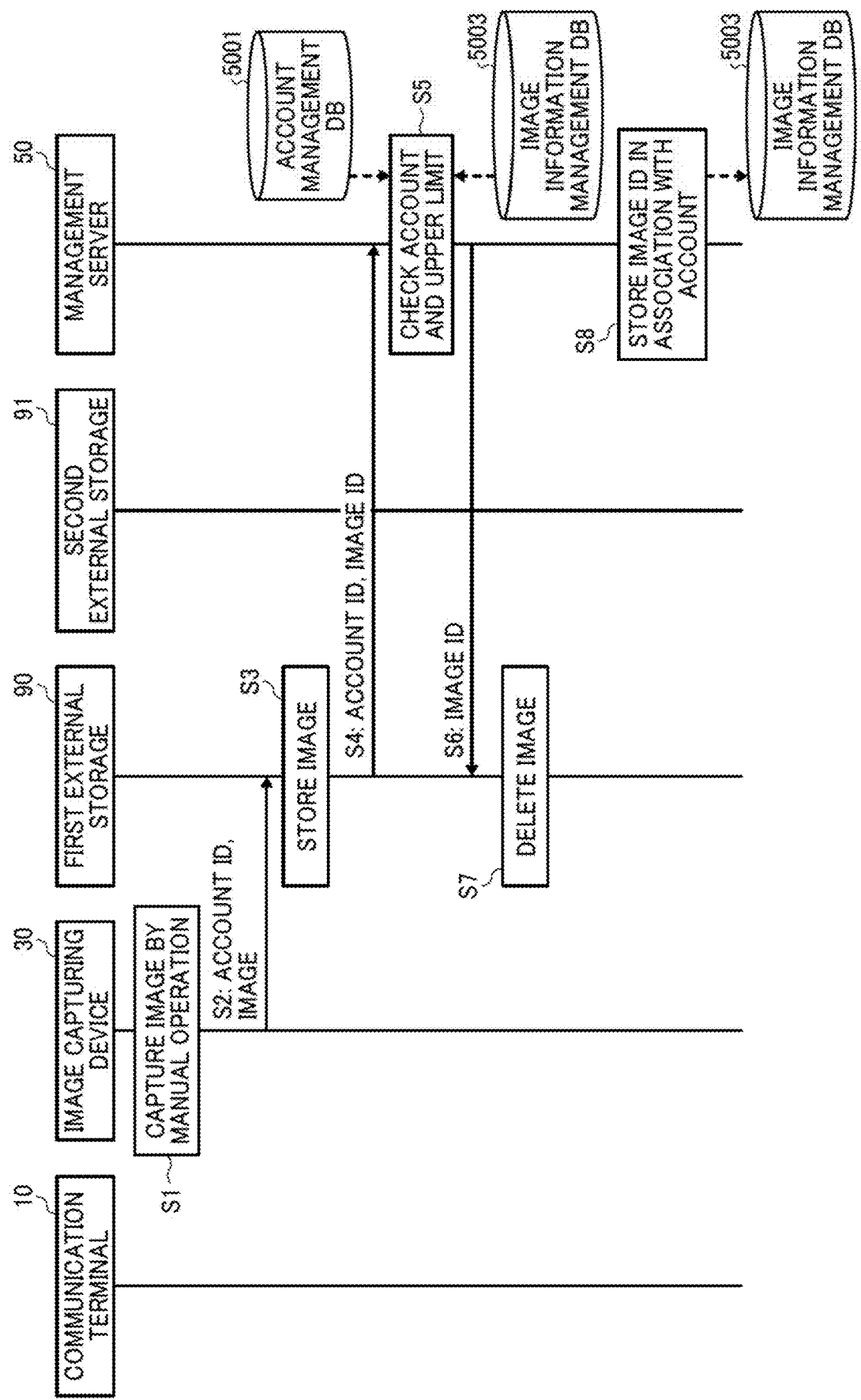
FIG. 9 is a sequence diagram illustrating an example of a process for storing a normal image according to the exemplary embodiment of the disclosure.

Processes or Operation: Process for Storing (Saving) Normal Image:

FIG. 9 is a sequence diagram illustrating an example of a process for storing (saving) a normal image according to the present embodiment. In the following description of the present embodiments, the communication system 1 is authorized to use the first external storage 90 and the second external storage 91.

In response to a user operation performed with respect to the operation unit 315, the imaging control unit 33 of the image capturing device 30 captures an image according to a manual operation of the user (step S1), and the transmission/reception unit 31 of the image capturing device 30 transmits an account ID and the image to the first external storage 90 (step S2).

The first external storage 90 stores the image transmitted from the image capturing device 30 (step S3), and transmits the account ID and an image ID to the management server 50 (step S4).

The image ID transmitted from the first external storage 90 to the management server 50 may be added to the image transmitted from the image capturing device 30, or may be assigned by the first external storage 90 based on the image transmitted from the image capturing device 30.

When the transmission/reception unit 51 of the management server 50 receives the account ID and the image ID transmitted from the first external storage 90, the determination unit 52 of the management server 50 acquires the account ID managed in the account management DB 5001 via the storing/reading unit 59 and determines whether the account ID transmitted from the first external storage 90 matches the account ID managed in the account management DB 5001.

The determination unit 52 of the management server 50 further acquires, via the storing/reading unit 59, the maximum number of images that can be stored, which is managed in the account management DB 5001, and the number of stored images, which is managed in the image information management DB 5003, and determines whether the number of stored images reaches the maximum number of images that can be stored, which is the upper limit (step S5). Details of a stored image managed in the image information management DB 5003 are described later.

When the determination unit 52 of the management server 50 determines that the account ID transmitted from the first external storage 90 does not match any account ID managed in the account management DB 5001, or the number of stored images managed in the image information management DB 5003 reaches the maximum number of images that can be stored, the transmission/reception unit 51 transmits, to the first external storage 90, the image ID identifying the image to be deleted (step S6).

Upon receiving the image ID transmitted from the management server 50, the first external storage 90 deletes the image corresponding to the image ID (step S7).

When the determination unit 52 of the management server 50 determines that the account ID transmitted from the first external storage 90 matches an account ID managed in the account management DB 5001, and that the number of stored images managed in the image information management DB 5003 does not reach the maximum number of images that can be stored, the setting unit 54 of the management server 50 stores, via the storing/reading unit 59, the image ID in association with the account ID in the image information management DB 5003 (step S8).

Figure 10:
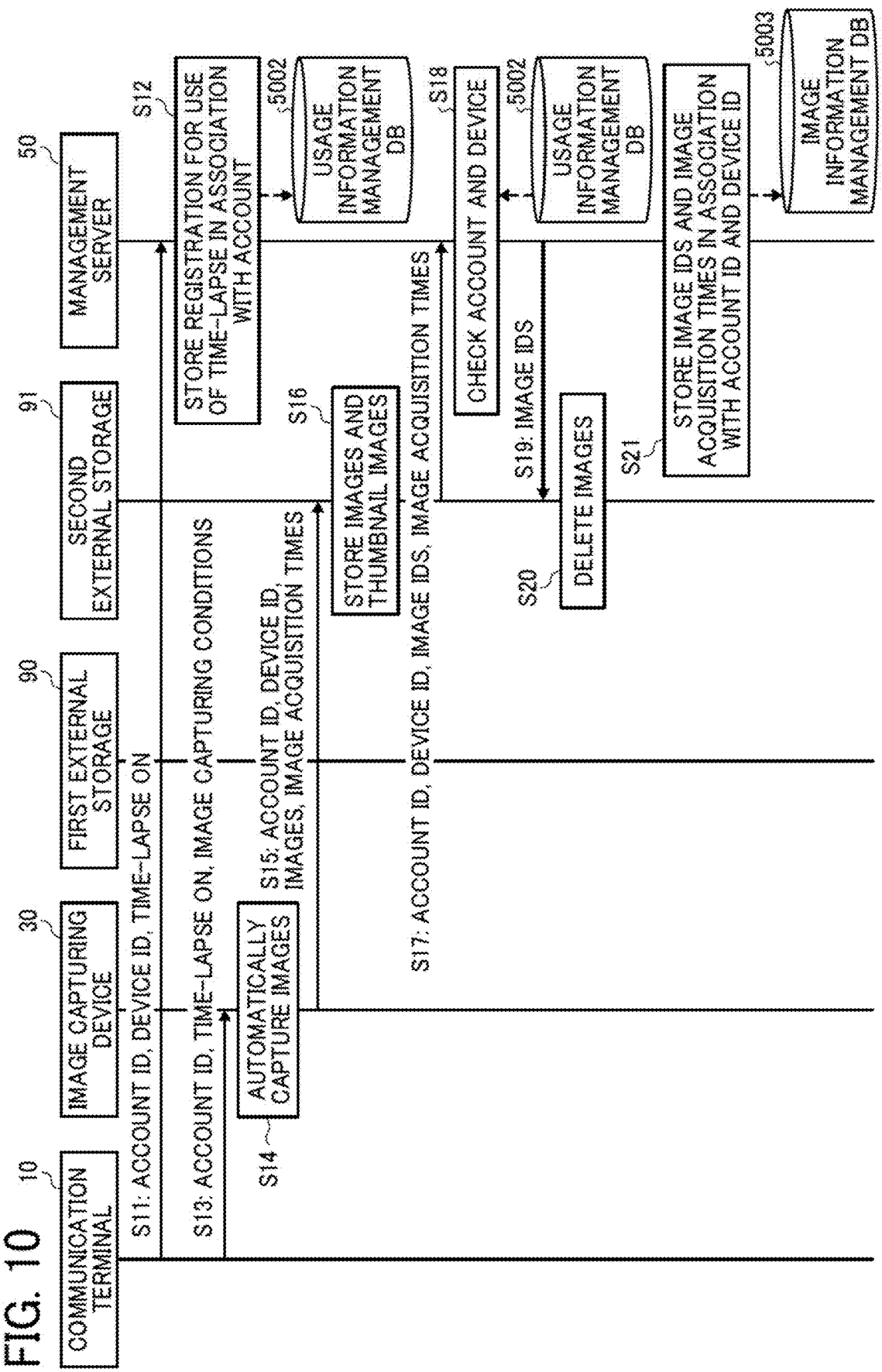
FIG. 10 is a sequence diagram illustrating an example of a process for storing a time-lapse image according to the exemplary embodiment of the disclosure.

Process for Storing (Saving) Time-Lapse Image:

FIG. 10 is a sequence diagram illustrating an example of a process for (storing) saving a time-lapse image according to the present embodiment.

The transmission/reception unit 11 of the communication terminal 10 transmits to the management server 50 an account ID, a device ID of the image capturing device 30 with which a time-lapse service is used, and time-lapse ON information indicating registration for using the time-lapse (step S11).

All or a part of the account ID, the device ID, and the time-lapse ON information may be input from the reception unit 12 of the communication terminal 10 or may be acquired from the management server 50.

When the transmission/reception unit 51 of the management server 50 receives the account ID, the device ID, and the time-lapse ON information transmitted from the communication terminal 10, the setting unit 54 of the management server 50 stores, via the storing/reading unit 59, the device ID in the usage information management DB 5002 in association with the account ID (step S12).

The transmission/reception unit 11 of the communication terminal 10 transmits the account ID, the time-lapse ON information, and image capturing conditions in the time-lapse service to the image capturing device 30 (step S13).

When the transmission/reception unit 31 of the image capturing device 30 receives the account ID, the time-lapse ON information, and the image capturing conditions transmitted from the communication terminal 10, the imaging control unit 33 of the image capturing device 30 automatically captures time-lapse images under the received image capturing conditions (step S14), and the transmission/reception unit 31 of the image capturing device 30 transmits the account ID, the device ID, images, and image acquisition times to the second external storage 91 (step S15).

The image capturing conditions received by the transmission/reception unit 31 of the image capturing device 30 from the communication terminal 10 include conditions such as an imaging interval, an imaging period, and whether to blur a person in time-lapse image capturing. Such image capturing conditions may be acquired from the management server 50 in alternative to receiving from the communication terminal 10.

The example in which the image capturing device 30 that have an automatic image capturing function (time-lapse image capturing function) receives the account ID, the time-lapse ON information, and the image capturing conditions transmitted from the communication terminal 10 is described above, with reference to the sequence diagram illustrated in FIG. 10. In a case where the image capturing device 30 does not have the automatic image capturing function, the image capturing device 30 can receive an application in relation to the automatic image capturing function transmitted from the communication terminal 10 and install the application.

As indicated in step S2 of FIG. 9 and step S14 of FIG. 10, the imaging control unit 33 of the image capturing device 30 transmits an image and other information to the first external storage 90 via the transmission/reception unit 31 when an image is captured according to a manual operation, and transmits an image and other information to the second external storage 91 via the transmission/reception unit 31 when a time-lapse image is automatically captured.

The image capturing device 30 illustrated in FIG. 10 may be another image capturing device that is different from the image capturing device 30 illustrated in FIG. 9.

The second external storage 91 stores the images and thumbnail images corresponding to the images transmitted from the image capturing device 30 (step S16), and transmits to the management server 50 the account ID, the device ID, image IDs, and the image acquisition times (step S17).

The thumbnail image stored in the second external storage 91 may be added to the image transmitted from the image capturing device 30, or may be generated by the second external storage 91 based on the image transmitted from the image capturing device 30.

The image ID transmitted from the second external storage 91 to the management server 50 may be added to the image transmitted from the image capturing device 30, or may be assigned by the second external storage 91 based on the image transmitted from the image capturing device 30.

When the transmission/reception unit 51 of the management server 50 receives the account ID, the device ID, the image IDs, and the image acquisition times transmitted from the second external storage 91, the determination unit 52 of the management server 50 acquires an account ID and a device ID managed in the usage information management DB 5002 via the storing/reading unit 59 and determines whether the account ID and device ID transmitted from the second external storage 91 match the account ID and device ID managed in association with each other in the usage information management DB 5002 (step S18).

When the determination unit 52 of the management server 50 determines that the account ID and the device ID transmitted from the second external storage 91 do not match the account ID and the device ID managed in association with each other in the usage information management DB 5002, the transmission/reception unit 51 of the management server 50 transmits to the second external storage 91, the image IDs corresponding to the images to be deleted.

When receiving the image ID from the management server 50, the second external storage 91 deletes the images corresponding to the image IDs (step S20).

When the determination unit 52 of the management server 50 determines that the account ID transmitted from the second external storage 91 matches the account ID managed in the usage information management DB 5002 and the device ID transmitted from the second external storage 91 matches the device ID managed in the usage information management DB 5002, the setting unit 54 of the management server 50 stores, via the storing/reading unit 59, the image IDs, the image acquisition times, and a deletion exclusion flag 0 that is an initial value in the image information management DB 5003 in association with the account ID, a time-lapse flag 1, and the device ID (step S21) (an example of a setting step).

Figure 11:
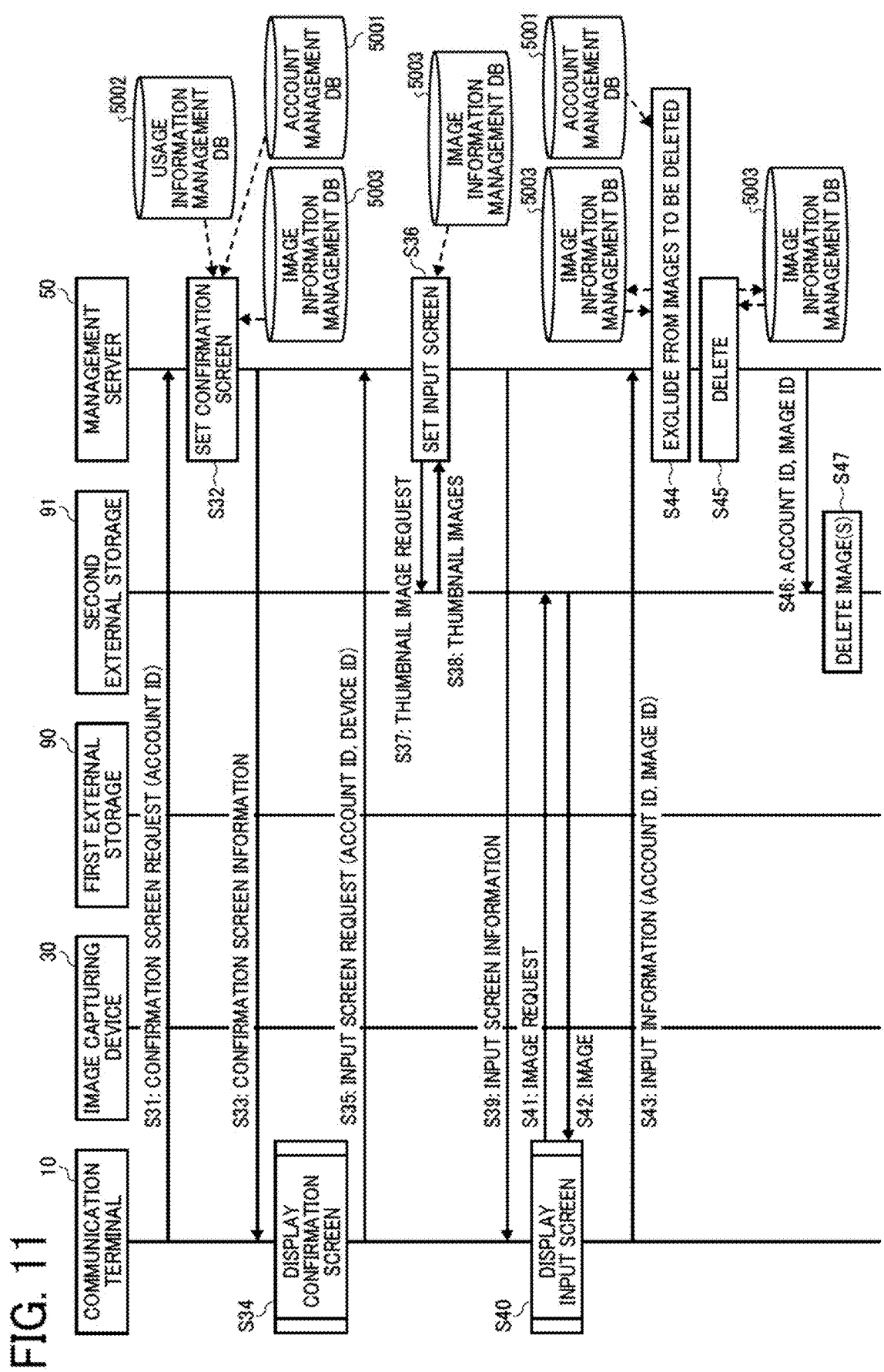
FIG. 11 is a sequence diagram illustrating an example of a process for managing a time-lapse image according to the exemplary embodiment of the disclosure.

Process for Managing of Time-Lapse Image:

FIG. 11 is a sequence diagram illustrating an example of a process for managing a time-lapse image according to the present embodiment.

The transmission/reception unit 11 of the communication terminal 10 transmits to the management server 50 a request for a confirmation screen together with the account ID (step S31). The request for a confirmation screen may be referred to as a confirmation screen request.

When the transmission/reception unit 51 of the management server 50 receives the confirmation screen request and the account ID transmitted from the communication terminal 10, the setting unit 54 of the management server 50 acquires, via the storing/reading unit 59, the maximum number of stored images and the maximum number of devices managed in the account management DB 5001, the user ID and the device ID managed in the usage information management DB 5002, and the number of stored images managed in the image information management DB 5003, and sets or configures a confirmation screen (step S32). The transmission/reception unit 51 of the management server 50 transmits confirmation screen information indicating the confirmation screen to the communication terminal 10 (step S33).

When the transmission/reception unit 11 of the communication terminal 10 receives the confirmation screen information from the management server 50, the display control unit 13 of the communication terminal 10 causes the display 106 to display the confirmation screen based on the received confirmation screen information (step S34).

The transmission/reception unit 11 of the communication terminal 10 transmits to the management server 50 a request for an input screen together with the account ID and the device ID (step S35) (an example of a transmitting step). The request for the input screen may be referred to as an input screen request.

When the transmission/reception unit 51 of the management server 50 receives the input screen request, the account ID, and the device ID transmitted from the communication terminal 10, the setting unit 54 of the management server 50 acquires, via the storing/reading unit 59, the image IDs, the image acquisition times, and a deletion exclusion flag of time-lapse flag 1 managed in the image information management DB 5003 based on the received account ID and device ID (step S36).

The transmission/reception unit 51 of the management server 50 transmits to the second external storage 91 the account ID, the image IDs acquired by the setting unit 54, and a request for thumbnail images corresponding to the image IDs (step S37). The request for thumbnail images may be referred to as a thumbnail image request.

Upon receiving the thumbnail image request and the image ID from the management server 50, the second external storage 91 transmits the image ID and the thumbnail images corresponding to the image IDs to the management server 50 (step S38).

When the transmission/reception unit 51 of the management server 50 receives the thumbnail images and the image IDs transmitted from the second external storage 91, the setting unit 54 of the management server 50 sets or configures an input screen based on the account ID and the device ID received from the communication terminal 10, the thumbnail images and the image IDs received from the second external storage 91, and the image acquisition times and the deletion exclusion flag acquired from the image information management DB 5003 (step S36). The transmission/reception unit 51 of the management server 50 transmits input screen information indicating the input screen to the communication terminal 10 (step S39).

When the transmission/reception unit 11 of the communication terminal 10 receives the input screen information transmitted from the management server 50, the display control unit 13 of the communication terminal 10 causes the display 106 to display the input screen based on the received input screen information (an example of displaying step), and the reception unit 12 of the communication terminal 10 receives an input operation performed by the user on the displayed input screen (step S40).

In response to a user operation of inputting information for requesting an image of a specific image ID to the input screen, the reception unit 12 receives the input of a request for the image of the specific image ID (the request may be referred to as an image request), and the transmission/reception unit 11 transmits to the second external storage 91 the account ID and the image request with respect to the image ID that is input (step S41).

When receiving the image request, the account ID, and the image ID transmitted from the communication terminal 10, the second external storage 91 transmits the image of the image ID to the communication terminal 10 (step S42).

When the transmission/reception unit 11 of the communication terminal 10 receives the image transmitted from the second external storage 91, the display control unit 13 of the communication terminal 10 causes the display 106 to display an input screen including the received image (step S40).

In response to a user operation of inputting, to the input screen, information for setting an image of a specific image ID to be excluded from the images to be deleted, the reception unit 12 accepts the input information for setting an image of a specific image ID to be excluded from the images to be deleted, and the transmission/reception unit 11 transmits to the management server 50 the account ID and the input information with respect to the image ID that is input (step S43).

When the transmission/reception unit 51 of the management server 50 receives the account ID and the image ID transmitted from the communication terminal 10, the setting unit 54 of the management server 50 stores, via the storing/reading unit 59, a deletion exclusion flag 1 for the received image ID of the account ID in the image information management DB 5003 (step S44) (an example of a setting step). A detailed description is given later of S44.

When the input information including a plurality of image IDs is transmitted in step S43, a plurality of images is set to be excluded from the images that are to be deleted in step S44.

The setting unit 54 of the management server 50 deletes, from the image information management DB 5003, an image ID and data associated with the image ID for which 30 days has elapsed from the acquisition (step S45). In the sequence diagram illustrated in FIG. 11, step S44 is followed by step S45, but in practice, the setting unit 54 of the management server 50 executes step S45 at a timing determined as a trigger in advance in the management server 50.

The transmission/reception unit 51 of the management server 50 transmits, to the second external storage 91, the account ID and the image ID that is to be deleted from the image information management DB 5003 (step S46). When receiving the account ID and the image ID transmitted from the management server 50, the second external storage 91 deletes the image corresponding to the image ID of the account ID (step S47).

Figure 12:
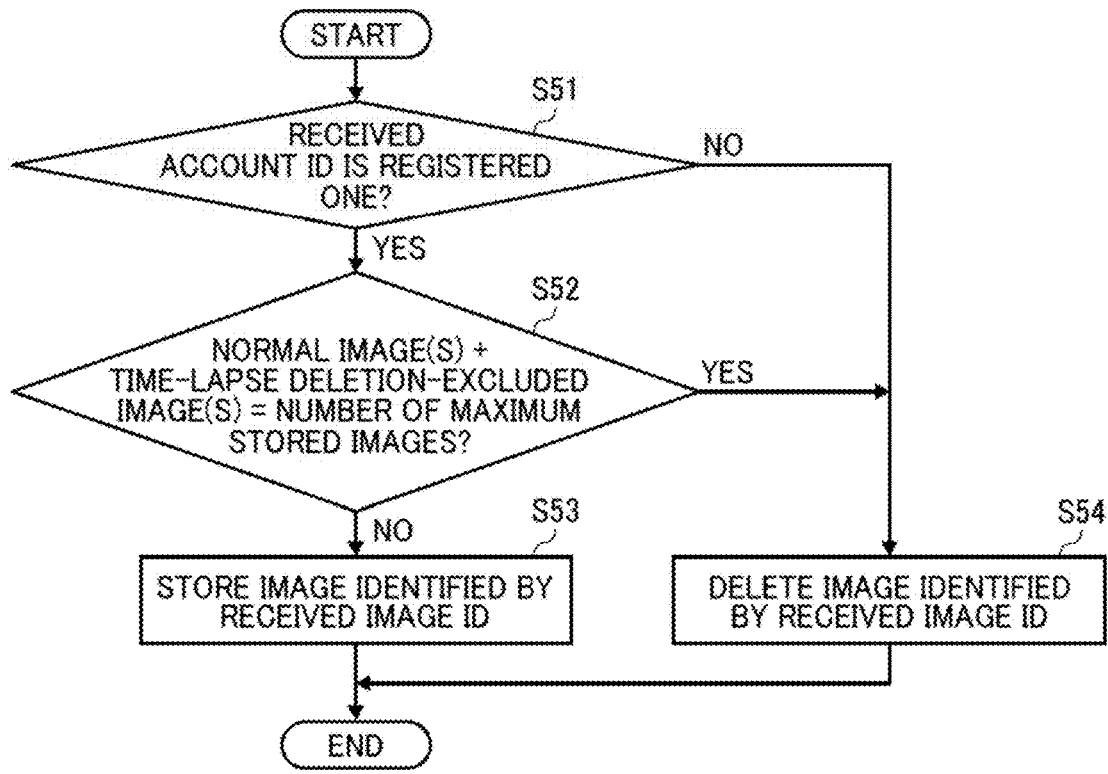
FIG. 12 is a flowchart illustrating an example of a process for storing a normal image according to the exemplary embodiment of the disclosure.

Process for Storing Normal Image:

FIG. 12 is a flowchart illustrating an example of a process for storing a normal image, and corresponds to the processing of step S5, step S6, and step S8 in the sequence diagram illustrated in FIG. 9.

The determination unit 52 of the management server 50 acquires an account ID managed in the account management DB 5001 via the storing/reading unit 59, and determines whether an account ID transmitted from the first external storage 90 matches the registered account ID managed in the account management DB 5001 (step S51).

When determining that the account ID is the registered one in step S51, the determination unit 52 of the management server 50 further acquires, via the storing/reading unit 59, the maximum number of images that can be stored, which is managed in the account management DB 5001, and the number of stored images, which is managed in the image information management DB 5003, and determines whether the number of stored images reaches the maximum number of images that can be stored, which is the upper limit (step S52). The determination unit 52 may determine whether the number obtained by adding the image corresponding to the image ID received this time to the number of stored images managed in the image information management DB 5003 exceeds the maximum number of images that can be stored.

The number of stored images managed in the image information management DB 5003 is a total number of the normal images and the time-lapse deletion-excluded images.

The normal image is an image corresponding to an image ID having no data on the time-lapse flag illustrated in FIG. 8, and the time-lapse deletion-excluded image is an image corresponding to an image ID having the deletion exclusion flag of 1 illustrated in FIG. 8.

When a determination result in step S52 indicates that the maximum number of images that can be stored has not been reached, the setting unit 54 of the management server 50 stores, via the storing/reading unit 59, the image ID in the image information management DB 5003 in association with the account ID, and keeps an image corresponding to the image ID stored in the first external storage 90 (step S53).

When a determination result in step S51 indicates that the account ID have not been registered, or when a determination result in step S52 indicates that the maximum number of images that can be stored has been reached, the transmission/reception unit 51 of the management server 50 transmits, to the first external storage 90, the image Id for deletion and the account ID to delete the image corresponding to the image ID from the first external storage 90 (step S54).

In case of the determination result indicating that the maximum number of images that can be stored has been reached in step S52, the transmission/reception unit 51 of the management server 50 may transmit, to the communication terminal 10, notification information notifying that an image captured by a manual operation is not to be stored.

When the determination unit 52 of the management server 50 determines that the number obtained by adding the image corresponding to the image ID received this time to the number of stored images managed in the image information management DB 5003 exceeds the maximum number of images that can be stored, the transmission/reception unit 51 of the management server 50 may transmit, to the communication terminal 10, notification information notifying in advance that an image captured by a manual operation is not to be stored.

In addition, the transmission/reception unit 51 of the management server 50 may transmit, to the communication terminal 10, not only the above-described notification information but also information on the above-described contract of the cloud service, web page link information of a contract contact (contract partner), and application information for changing contract details, for example.

According to the present embodiment, although, by using the time-lapse image capturing, the upper limit of the storage condition in the usage contract is not immediately exceed, determining that the maximum number of images that can be stored has been reached in step S52 can be an opportunity for a user to desire for changing the plan in the contract details to make the upper limit be increased.

Figure 13:
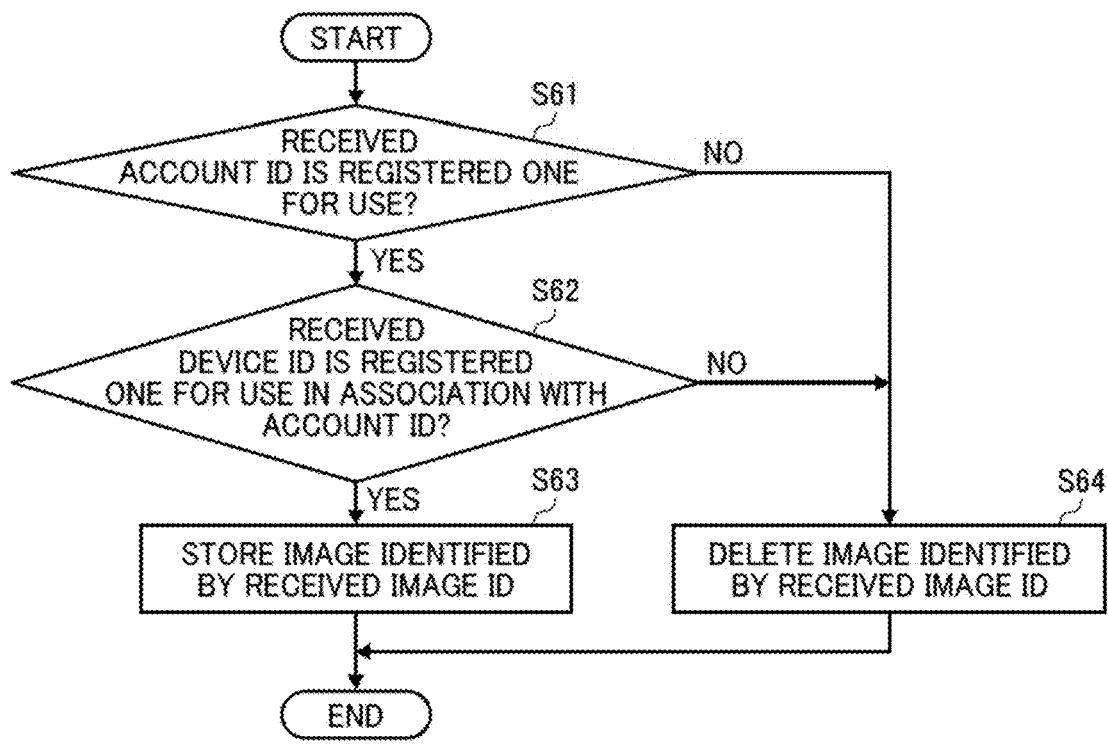
FIG. 13 is a flowchart illustrating an example of a process for storing a time-lapse image according to the exemplary embodiment of the disclosure.

Process for Storing Time-Lapse Image:

FIG. 13 is a flowchart illustrating an example of a process for storing a time-lapse image, and corresponds to the processing of step S18, step S19, and step S20 in the sequence diagram illustrated in FIG. 10.

The determination unit 52 of the management server 50 acquires an account ID managed in the usage information management DB 5002 via the storing/reading unit 59, and determines whether the account ID transmitted from the second external storage 91 matches the registered account ID for use, which is managed in the usage information management DB 5002 (step S61).

When a determination result in step S61 indicates that the account ID is the same as the one registered for use, the determination unit 52 of the management server 50 acquires, via the storing/reading unit 59, a device ID that is managed in the usage information management DB 5002 in association with the account ID, which is determined as the same in S61 and determines whether a device ID transmitted from the second external storage 91 matches the device ID acquired from the usage information management DB 5002 (step S62).

When a determination result in step S62 indicates that the device ID is the same as the one registered for use, the setting unit 54 of the management server 50 stores, via the storing/reading unit 59, the image ID, the image acquisition time, and the initial value 0 of the deletion exclusion flag in the image information management DB 5003 in association with the account ID, the time-lapse flag 1, and the device ID, while keeping an image corresponding to the image ID be stored in the second external storage 91 (step S63).

When a determination result in step S61 indicates that the account ID has not been registered for use, or when a determination result in step S62 indicates that the device ID has not been registered for use, the transmission/reception unit 51 of the management server 50 transmits the image ID for deletion and the account ID to the second external storage 91 to delete the image corresponding to the image ID from the second external storage 91 (step S64).

Figure 14:
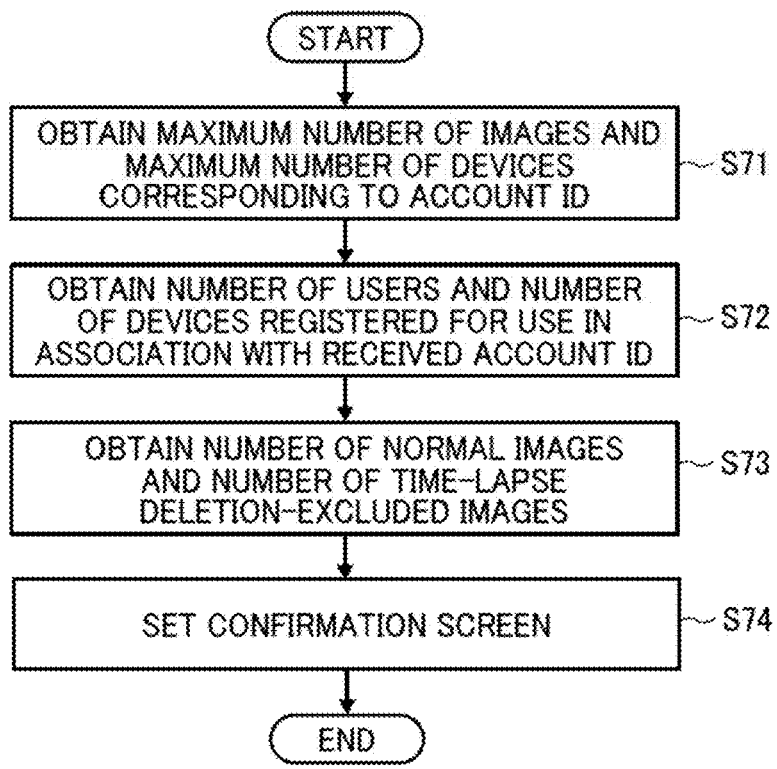
FIG. 14 is a flowchart illustrating an example of a process for setting or configuring a confirmation screen according to the exemplary embodiment of the disclosure.

Process for Setting Confirmation Screen:

FIG. 14 is a flowchart illustrating an example of a process for setting or configuring a confirmation screen, and corresponds to step S32 of the sequence diagram illustrated in FIG. 11.

The setting unit 54 of the management server 50 acquires, from the account management DB 5001, the maximum number of images that can be stored and the maximum number of devices that can be used corresponding to the received account ID, via the storing/reading unit 59 (step S71).

The setting unit 54 of the management server 50 acquires, from the usage information management DB 5002, the number of user IDs and the number of device IDs that are registered for use corresponding to the account ID transmitted from the communication terminal 10, via the storing/reading unit 59 (step S72).

The setting unit 54 of the management server 50 acquires, from the image information management DB 5003, the number of image IDs of images to be stored corresponding to the account ID transmitted from the communication terminal 10, via the storing/reading unit 59 (step S73).

The number of stored images managed in the image information management DB 5003 is a total number of the normal images and the time-lapse deletion-excluded images.

The normal image is an image corresponding to an image ID having no data on the time-lapse flag illustrated in FIG. 8, and the time-lapse deletion-excluded image is an image corresponding to an image ID having the deletion exclusion flag of 1 illustrated in FIG. 8.

The setting unit 54 of the management server 50 sets or configures a confirmation screen based on the information acquired in steps S71 to S73 (step S74).

Figure 15:
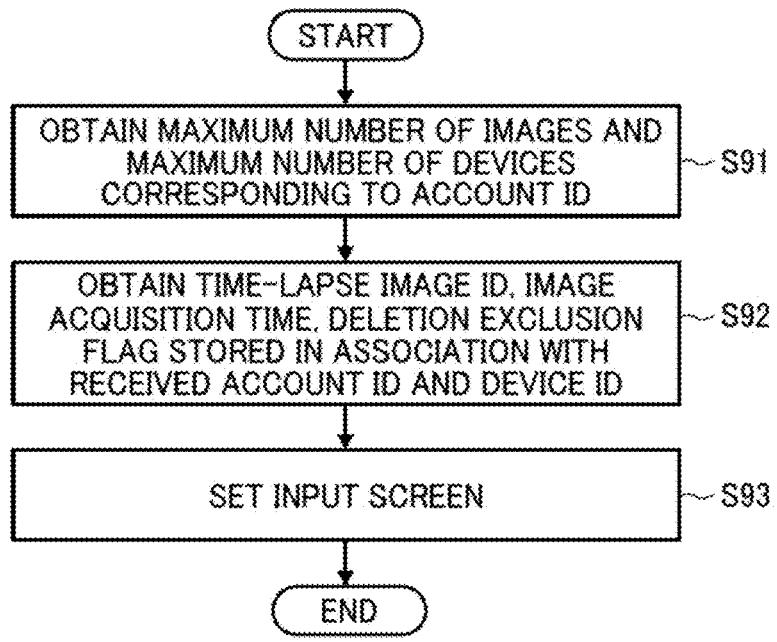
FIG. 15 is a flowchart illustrating an example of a process for setting or configuring an input screen according to the exemplary embodiment of the disclosure.

Process for Setting Input Screen:

FIG. 15 is a flowchart illustrating an example of a process for setting or configuring an input screen, and corresponds to step S36 of the sequence diagram illustrated in FIG. 10.

The setting unit 54 of the management server 50 acquires, from the account management DB 5001, the maximum number of images that can be stored corresponding to the received account ID, via the storing/reading unit 59 (step S91).

The setting unit 54 of the management server 50 acquires, from the image information management DB 5003, an image ID corresponding to the time-lapse flag 1, an image acquisition time, and a deletion exclusion flag corresponding to the received account ID and device ID, via the storing/reading unit 59 (step S92).

The setting unit 54 of the management server 50 sets or configures an input screen based on the information acquired in steps S91 and S92 (step S93).

Figure 16:
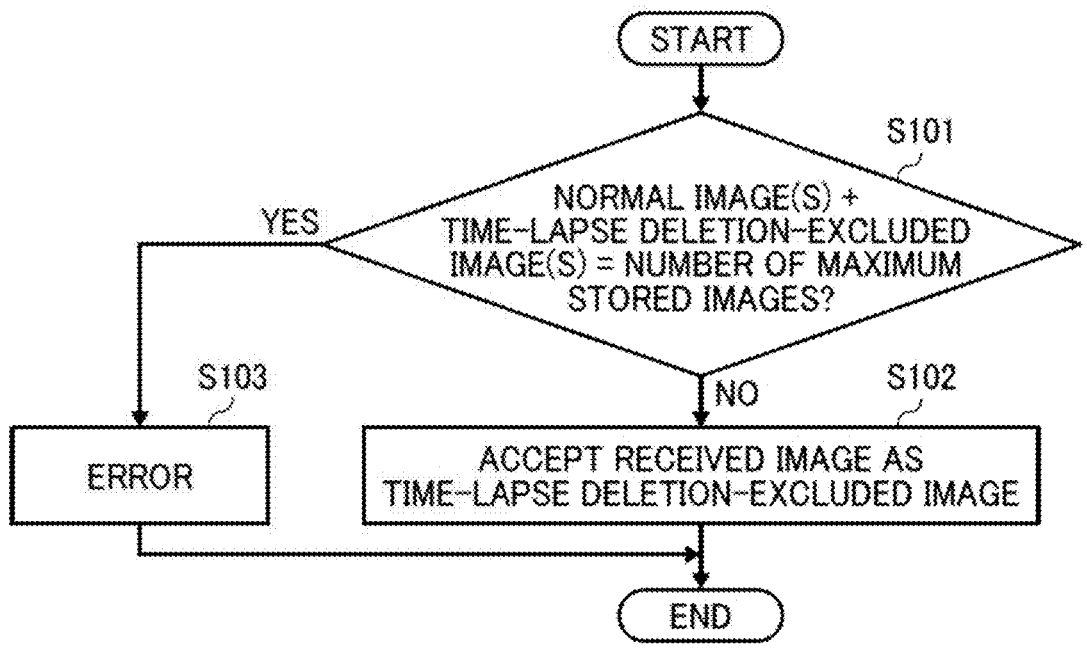
FIG. 16 is a flowchart illustrating an example of a process for excluding a time-lapse image from ones to be deleted according to the exemplary embodiment of the disclosure.

Process for Excluding Time-Lapse Image from Ones to be Deleted:

FIG. 16 is a flowchart illustrating an example of a process for excluding a time-lapse image from ones to be deleted, and indicating details of the processing of step S44 of the sequence diagram illustrated in FIG. 10.

The determination unit 52 of the management server 50 acquires, via the storing/reading unit 59, the maximum number of images that can be stored corresponding to the received account ID and the number of stored images corresponding to the received account ID, from the account management DB 5001 and the image information management DB 5003, respectively, and determines whether the number of stored images has reached the maximum number of images that can be stored (step S101).

The determination unit 52 may determine whether the number obtained by adding the image corresponding to the image ID received this time to the number of stored images managed in the image information management DB 5003 exceeds the maximum number of images that can be stored.

The number of stored images managed in the image information management DB 5003 is a total number of the normal images and the time-lapse deletion-excluded images.

The normal image is an image corresponding to an image ID having no data on the time-lapse flag illustrated in FIG. 8, and the time-lapse deletion-excluded image is an image corresponding to an image ID having the deletion exclusion flag of 1 illustrated in FIG. 8.

When a determination result in step S101 indicates that the maximum number of images that can be stored has not been reached, the setting unit 54 of the management server 50 accepts the input information and stores, via the storing/reading unit 59, the deletion exclusion flag 1 for the received image ID in the image information management DB 5003 (step S102).

When a determination result in step S101 indicates that the maximum number of images that can be stored has been reached, the setting unit 54 of the management server 50 sets an error, does not accept the input information, and does not store the received image ID in the image information management DB 5003 (step S102).

In step S102, the setting unit 54 of the management server 50 may set or configure an input screen including error information indicating that the input information has not been accepted, and the transmission/reception unit 51 of the management server 50 may transmit input screen information including an error screen to the communication terminal 10. In the description of embodiments, the error screen includes notification information for notifying that setting an image to be excluded from the deletion is unavailable.

In addition, the transmission/reception unit 51 of the management server 50 may transmit, to the communication terminal 10, not only the above-described notification information but also information on the above-described contract of the cloud service, web page link information of a contract contact (contract partner), and application information for changing contract details, for example.

According to the present embodiment, although, by using the time-lapse image capturing, the upper limit of the storage condition in the usage contract is not immediately exceed, determining that the maximum number of images that can be stored has been reached in step S101 can be an opportunity for a user to desire for changing the plan in the contract details to make the upper limit be increased.

Figure 17:
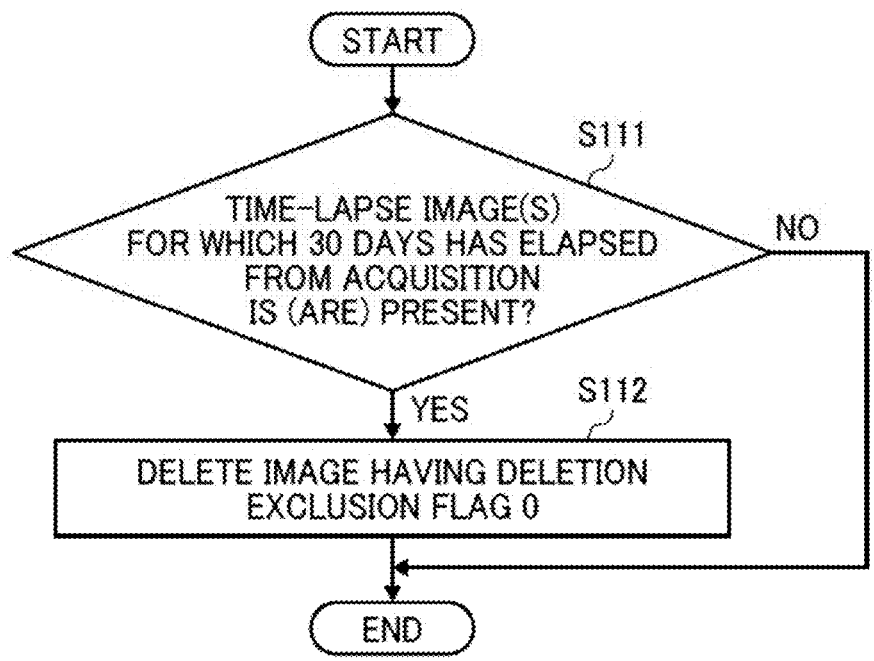
FIG. 17 is a flowchart illustrating an example of a process for deleting a time-lapse image according to the exemplary embodiment of the disclosure.

Process for Deleting Time-Lapse Image:

FIG. 17 is a flowchart illustrating an example of a process for deleting a time-lapse image, and corresponds to step S45 of the sequence diagram illustrated in FIG. 11.

The determination unit 52 of the management server 50 acquires one or more image IDs each of which is corresponding to the time-lapse flag 1 and the deletion exclusion flag 0, which are managed in the image information management DB 5003, and corresponding one or more image acquisition times, via the storing/reading unit 59, at a predetermined time determined in advance, and determines whether presence or absence of an image ID for which 30 days have passed since the acquisition (image acquisition) (step S111).

When there are image ID for which 30 days have passed since the acquisition in step S111, the setting unit 54 of the management server 50 deletes the image ID and the data associated with the image ID from the image information management DB 5003 (step S112).

Confirmation Screen:

FIG. 18 is a diagram illustrating an example of a confirmation screen corresponding to step S34 of the sequence diagram illustrated in FIG. 11.

The display control unit 13 of the communication terminal 10 causes the display 106 to display a confirmation screen 200 illustrated in FIG. 18 based on the received confirmation screen information.

The display control unit 13 displays the confirmation screen 200 including member number information 201 indicating the number of user IDs, "14," acquired from the usage information management DB 5002, device number information 202 indicating the number of device IDs, "3," acquired from the usage information management DB 5002, image number information 203 indicating the number of normal images, "7," acquired from the image information management DB 5003, image number information 204 indicating the number of time-lapse deletion-excluded images, "0," acquired from the image information management DB 5003, maximum member number information 205 indicating the maximum number of devices that can use a service, "20," acquired from the account management DB 5001, and maximum image number information 206 indicating the maximum number of images that can be stored, "1000," acquired from the account management DB 5001.

In the description of embodiments, "LIVE VIEW" displayed on the confirmation screen 200 is an example expression indicating the "time-lapse service."

In addition, "NUMBER OF LIVE VIEW DEVICES" displayed in association with the device number information 202 is an example expression indicating the "number of devices that can use the time-lapse service" described in FIG. 7.

In addition, "NUMBER OF LOCKED LIVE VIEW IMAGES" displayed in association with the image number information 204 is an example expression indicating the "number of images that are captured by time-lapse image capturing and to which the deletion exclusion flag is assigned" described with reference to FIG. 9.

The display control unit 13 displays the member number information 201 in a manner that the member number information 201 further includes information indicating a remaining number, "3", obtained by subtracting the number of user IDs, "14", acquired from the usage information management DB 5002 and the number of device IDs, "3", acquired from the usage information management DB 5002 from the maximum number of devices, "20", acquired from the account management DB 5001.

The display control unit 13 displays the device number information 202 in a manner that the device number information 202 further includes information indicating a remaining number, "3", obtained by subtracting the number of user IDs, "14", acquired from the usage information management DB 5002 and the number of device IDs, "3", acquired from the usage information management DB 5002 from the maximum number of devices, "20", acquired from the account management DB 5001.

Since both the remaining number in the member number information 201 and the remaining number in the device number information 202 are determined based on the maximum member number information 205, the remaining number in the member number information 201 and the remaining number in the device number information 202 have the same value.

The display control unit 13 displays the image number information 203 in a manner that the image number information 203 further includes information indicating a remaining number, "993," obtained by subtracting the number of normal images, "7," acquired from the image information management DB 5003 and the number of time-lapse deletion-excluded images, "0," acquired from the image information management DB 5003 from the maximum number of images that can be stored, "1000," acquired from the account management DB 5001.

The display control unit 13 displays the image number information 204 in a manner that the image number information 204 further includes information indicating the remaining number, "993," obtained by subtracting the number of normal images, "7," acquired from the image information management DB 5003 and the number of time-lapse deletion-excluded images, "0," acquired from the image information management DB 5003 from the maximum number of images that can be stored, "1000," acquired from the account management DB 5001.

Since both the remaining number in the image number information 203 and the remaining number in the image number information 204 are determined based on the maximum image number information 206, the remaining number in the image number information 203 and the remaining number in the image number information 204 have the same value.

Figure 19:
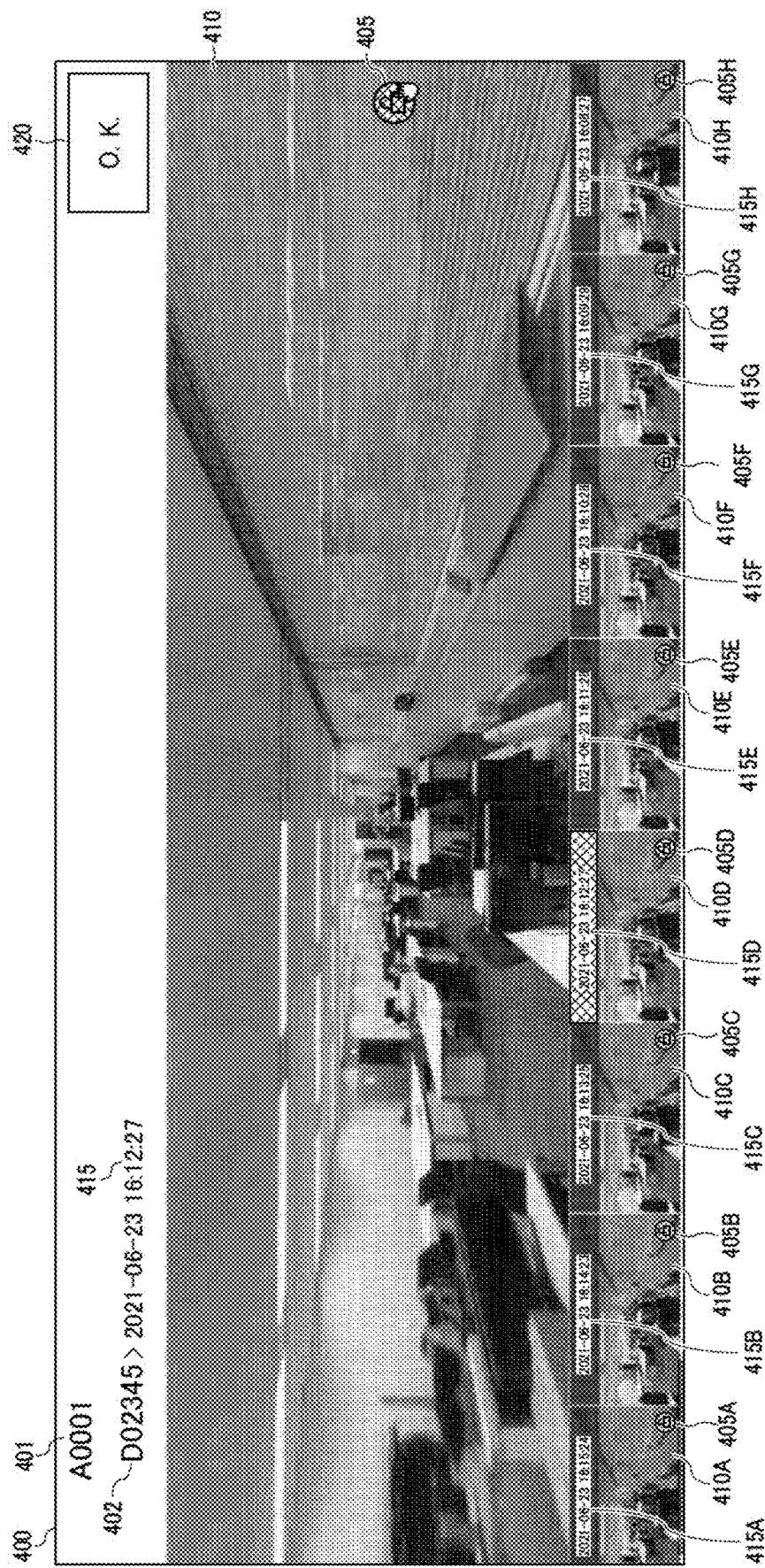
FIG. 19 is a diagram illustrating an example of an input screen according to the exemplary embodiment of the disclosure.

Input Screen:

FIG. 19 is a diagram illustrating an example of an input screen corresponding to step S40 of the sequence diagram illustrated in FIG. 11.

The display control unit 13 of the communication terminal 10 causes the display 106 to display an input screen 400 illustrated in FIG. 19 based on the received input screen information.

The display control unit 13 displays the input screen 400 including account information 401 indicating an account ID, "A0001," with which an input screen is requested in step S35, device information 402 indicating a device ID, "D02345," with which an input screen is requested in step S35, image information 410 indicating an image acquired from the second external storage 91 in step S42, thumbnail image information including thumbnail image information items 410A to 410H indicating thumbnail images acquired from the second external storage 91 in step S38, acquisition time information including acquisition time information items 415 and 415A to 415H indicating image acquisition times acquired from the image information management DB 5003, and setting information including setting information items 405A to 405H indicating deletion exclusion flags acquired from the image information management DB 5003, a change button 405 for changing, or switching, the deletion exclusion flag, and a confirmation button (O.K. button) 420 for confirming in relation to the deletion exclusion flag.

The display control unit 13 displays the input screen 400 such that each of the acquisition time information items 415A to 415H is positioned above the corresponding one of the thumbnail image information items 410A to 410H, each of the setting information items 405A to 405H is superimposed on the corresponding one of the thumbnail image information items 410A to 410H, and the change button 405 is superimposed on the image information 410.

The display control unit 13 causes the thumbnail image information items 410A to 410H to be displayed in order from the latest one indicated by the acquisition time from the left. Horizontally scrolling the thumbnail image information items 410A to 410H allows the display control unit 13 to display 60 thumbnail images, for example.

The display control unit 13 initially displays an image corresponding to the thumbnail image information item 410A that is a latest image indicated by the acquisition time as the image information 410.

Specifically, the transmission/reception unit 11 transmits the account ID and an image request for an image ID corresponding to the latest acquisition time to the second external storage 91, and receives an image corresponding to the latest acquisition time transmitted from the second external storage 91. The display control unit 13 initially displays the received image as the image information 410, initially displays the acquisition time of the received image as the acquisition time information item 415. The display control unit 13 further displays the acquisition time information item 415A corresponding to the thumbnail image information item 410A of the latest acquisition time in an emphasized manner.

In response to a user operation performed with respect to one of the thumbnail image information items 410A to 410H, the reception unit 12 of the communication terminal 10 receives an operation instruction to the one of the thumbnail image information items 410A to 410H. The example of FIG. 19 illustrates a state in which the user operates with respect to the thumbnail image information item 410D.

Then, as illustrated in step S41 and step S42 in FIG. 11, the transmission/reception unit 11 transmits, to the second external storage 91, the account ID and an image request for an image ID corresponding to the thumbnail image information item 410D for which the operation instruction has been received, and receives the image transmitted from the second external storage 91. In addition, the display control unit 13 displays the received image as the image information 410, displays the image acquisition time of the received image as the acquisition time information item 415, and displays in an emphasized manner the acquisition time information item 415D of the image corresponding to the thumbnail image information item 410D, on which the user operation is performed.

In response to a user operation of pressing the change button 405 in the state illustrated in FIG. 19, the reception unit 12 receives a change instruction to change the deletion exclusion flag to 1 for the image displayed as the image information 410 and indicated in the thumbnail image information item 410D. The display control unit 13 displays the change button 405 and the setting information item 405D in an emphasized manner based on the reception of the change instruction.

In response to a user operation of pressing the confirmation button 420, the reception unit 12 receives a confirmation instruction to set the deletion exclusion flag to 1 for the image displayed as the image information 410 and indicated in the thumbnail image information item 410D. The confirmation button 420 may not be provided, and the change instruction for changing the deletion exclusion flag to 1 and the confirmation instruction for setting the deletion exclusion flag to 1 may be combined by pressing the change button 405. This can prevent an operation error occurring in a case that the user forgets to press the confirmation button 420.

Then, as illustrated in step S43 of FIG. 11, the transmission/reception unit 11 transmits, to the management server 50, input information for setting the deletion exclusion flag to 1 for the image ID corresponding to the account ID and the thumbnail image information item 410D.

Pressing the change button 405 after a user operation is performed with respect to one of the thumbnail image information items 410A to 410H may be performed with respect to two or more of the thumbnail image information items, and then the confirmation button 420 may be pressed. In case that the change button 405 is pressed for two or more of the thumbnail image information items for the change instructions to change the deletion exclusion flags to 1, a cancel button for collectively cancelling all the change instructions may be displayed on the input screen 400. This allows the user to collectively cancel the change instructions in relation to the two or more of the thumbnail image information items.

In this case, the reception unit 12 receives a confirmation instruction to set the deletion exclusion flag of each of the corresponding two or more of images indicated as each of the two or more of thumbnail images to 1, and the transmission/reception unit 11 transmits, to the management server 50, input information to set the deletion exclusion flag of each of the two or more of image IDs corresponding to the account ID and each of the two or more of thumbnail images to 1.

The deletion exclusion flag 1 can be canceled even after the confirmation instruction to set the deletion exclusion flag to 1 is given once. By pressing the change button 405 again with respect to a thumbnail image information item, among the thumbnail image information items 410A to 410H, for which the confirmation instruction to set the deletion exclusion flag to 1 according to a user operation, the deletion exclusion flag 1 is canceled. In substantially the same manner as the case of changing the deletion exclusion flag to 1, the confirmation instruction may be issued by pressing the confirmation button 420, or each of the change instruction for changing the deletion exclusion flag and the confirmation instruction for cancelling the deletion exclusion flag may be issued by pressing the change button 405. In addition, the deletion exclusion flag 1 may be canceled for two or more of the thumbnail image information items. Further, a function of displaying a thumbnail image to which a deletion exclusion flag is attached may be provided, and in this state, a cancel designation button for specifying a predetermined period in relation to the image acquisition time information to cancel the deletion exclusion flag may be displayed on the input screen 400. Further, an all-cancel button for canceling all the deletion exclusion flags may be displayed on the input screen 400.

Variations of Embodiment

Figure 20:
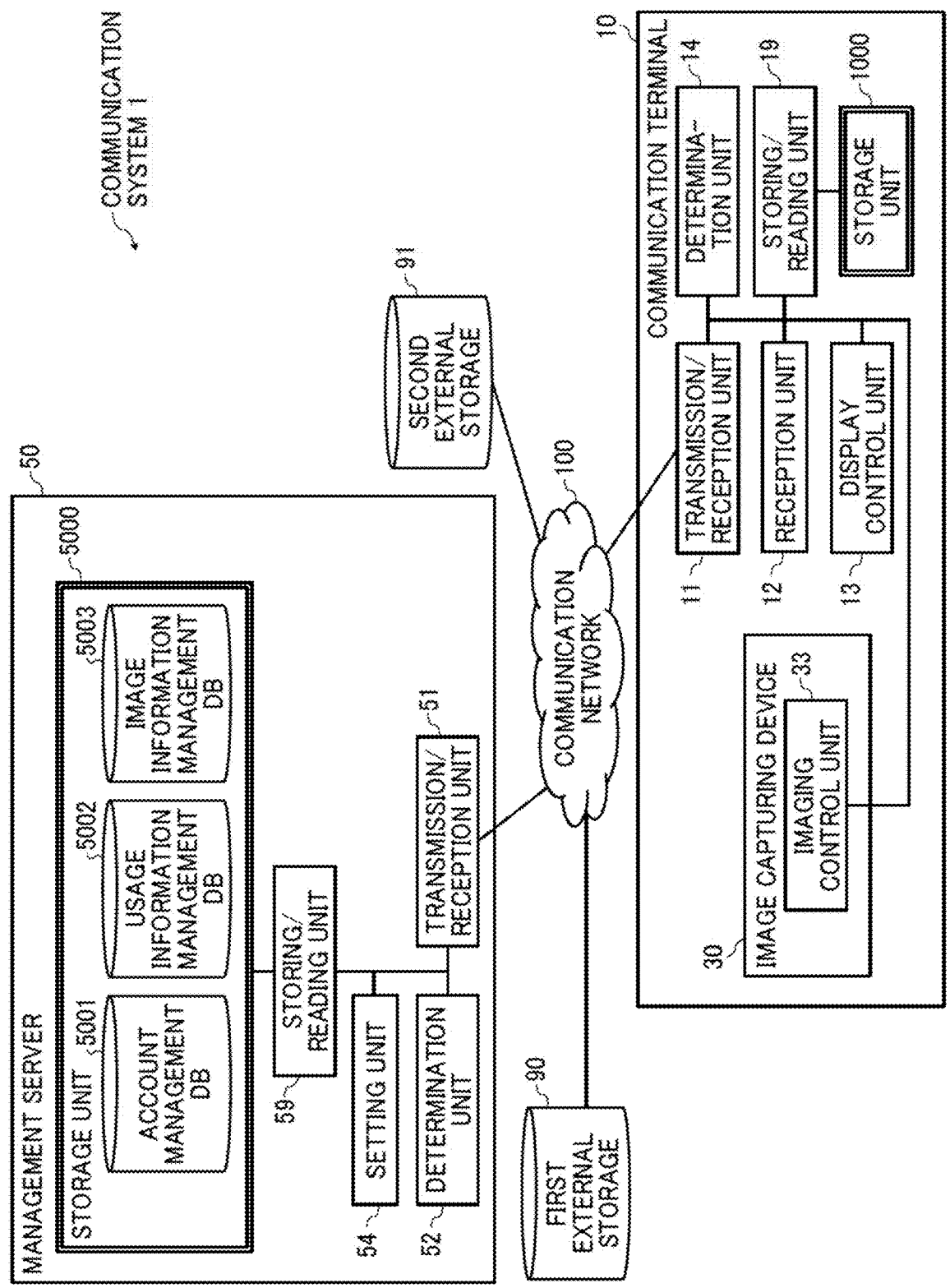
FIG. 20 is a block diagram illustrating an example of a functional configuration of a communication system according to a variation of the exemplary embodiment.

FIG. 20 is a block diagram illustrating an example of a functional configuration of a communication system according to a variation of the above-described embodiment. In the communication system 1 illustrated in FIG. 5, the image capturing device 30 communicates with the communication terminal 10 via the communication network 100, but in the variation of the communication system 1 of FIG. 20, the image capturing device 30 is built in the communication terminal 10.

Figure 21:
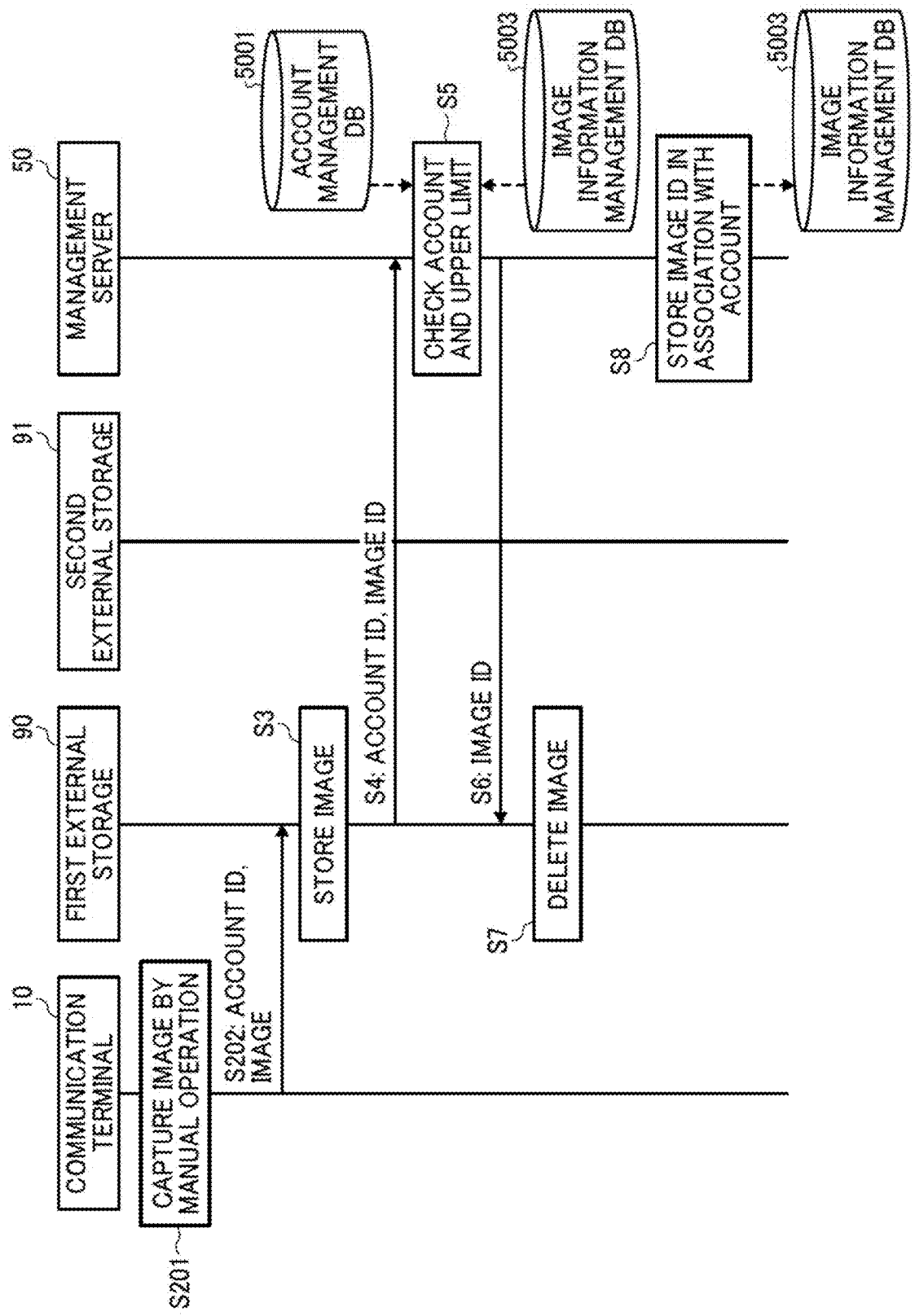
FIG. 21 is a sequence diagram illustrating an example of a process for storing a normal image according to the variation of FIG. 20.

FIG. 21 is a sequence diagram illustrating an example of a process for storing a normal image according to the variation of FIG. 20.

In response to a user operation with respect to the operation unit 315, the imaging control unit 33 of the image capturing device 30 built in the communication terminal 10 captures an image according to a manual operation of the user (step S201), and the transmission/reception unit 11 of the communication terminal 10 transmits an account ID and the image to the first external storage 90 (step S202). The other processing steps are substantially the same as the ones in the sequence diagram illustrated in FIG. 9.

Figure 22:
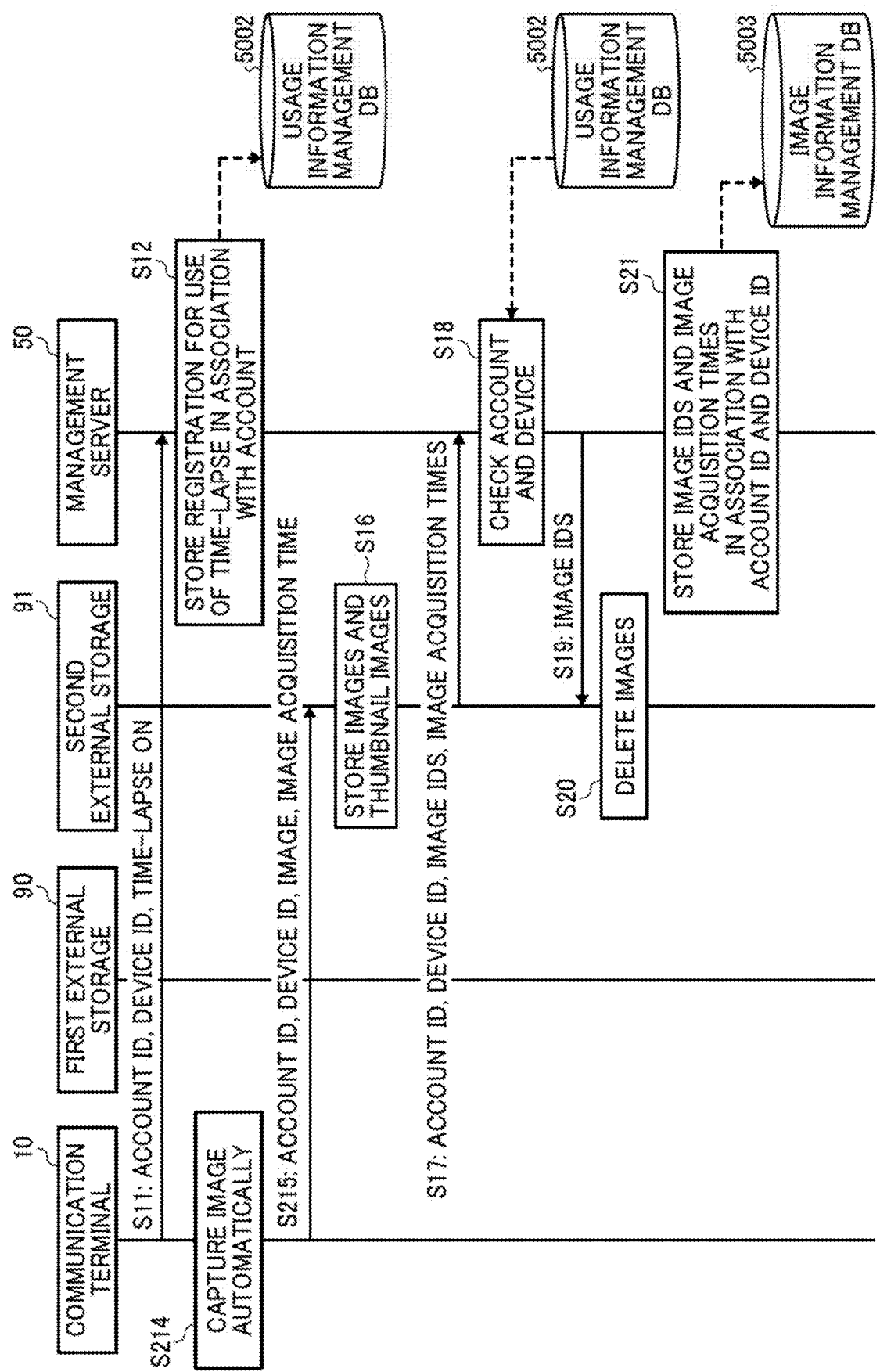
FIG. 22 is a sequence diagram illustrating an example of a process for storing a time-lapse image according to the variation of FIG. 20.

FIG. 22 is a sequence diagram illustrating an example of a process for storing a time-lapse image according to the variation of FIG. 20.

The imaging control unit 33 of the image capturing device 30 built in the communication terminal 10 automatically captures time-lapse images under predetermined image capturing conditions (step S214), and the transmission/reception unit 11 of the communication terminal 10 transmits an account ID, a device ID, images, and image acquisition times to the second external storage 91 (step S215). The other processing steps are substantially the same as the ones in the sequence diagram illustrated in FIG. 10.

In the example variation of the communication system illustrated in FIGS. 20 and 21, the communication terminal 10 transmits the image manually or automatically captured by the imaging control unit 33 of the built-in image capturing device 30 to the first external storage 90 and the second external storage 91 to store the image. As a further modified example variation, the communication terminal 10 may transmit data such as an image acquired from the outside to the first external storage 90 and the second external storage 91 to store the data.

Furthermore, as another configuration of the communication system, the communication system 1 may include the image capturing device 30 that is one example of a measurement device and the communication terminal 10 that are communicably connected via the communication network 100, and the communication terminal 10 may include the functions of the management server 50. In this case, the first external storage 90 and the second external storage 91 may be communicably connected to the communication terminal via the communication network 100, or may be built in or connected by wire to the communication terminal 10.

Figure 23:
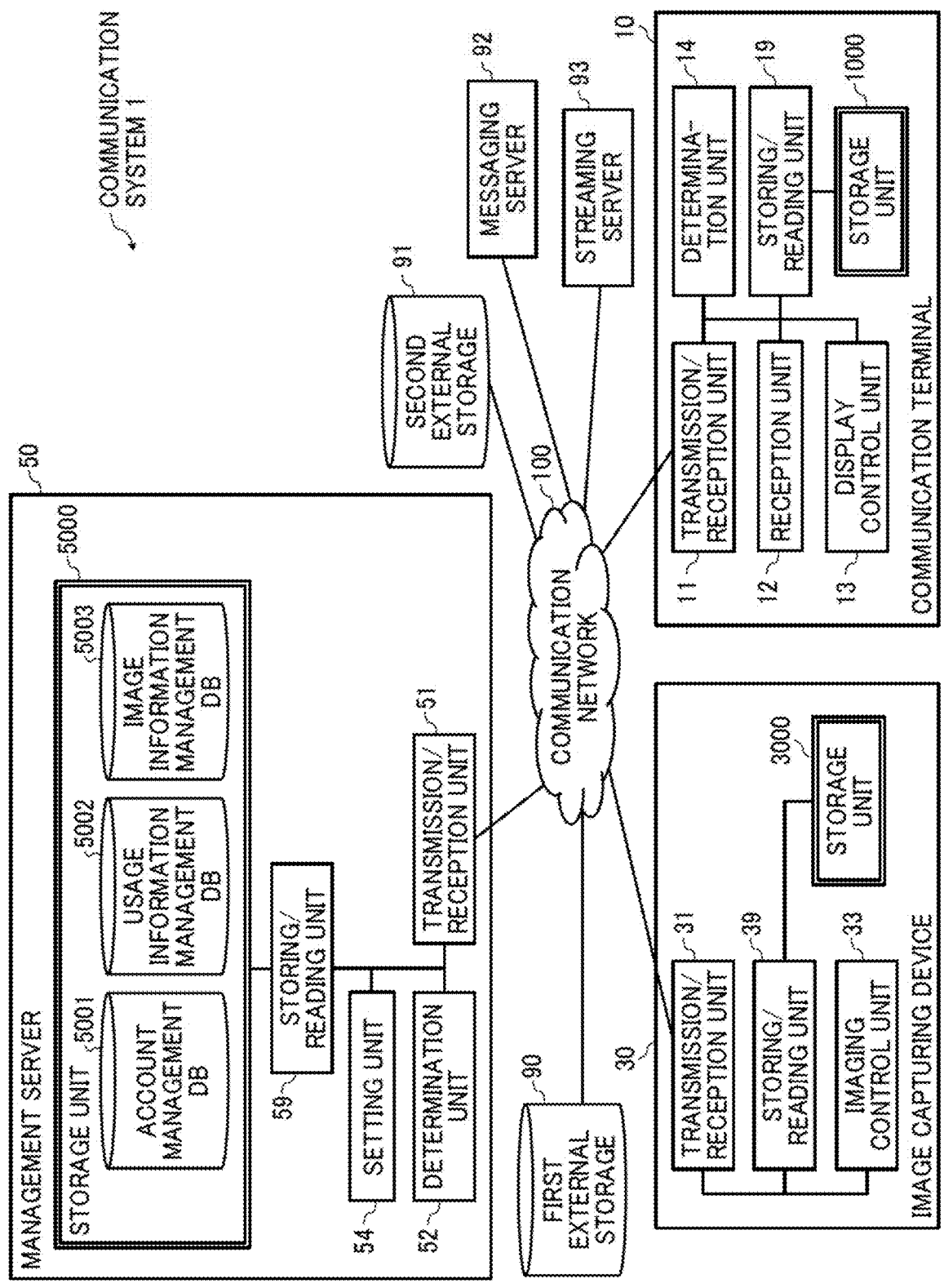
FIG. 23 is a block diagram illustrating an example of a functional configuration of a communication system according to a second variation of the exemplary embodiment of the disclosure.

Second Variation:

FIG. 23 is a block diagram illustrating an example of a functional configuration of a communication system according to a second variation of the above-described embodiment.

The communication system 1 illustrated in FIG. 23 further includes a messaging server 92 that manages streaming of moving images and a streaming server 93 that streams moving images, in addition to the communication system 1 illustrated in FIG. 5. Specifically, the messaging server 92 is an intermediary server for communicating for starting or ending of streaming between the image capturing device 30 and the management server 50.

Figure 24:
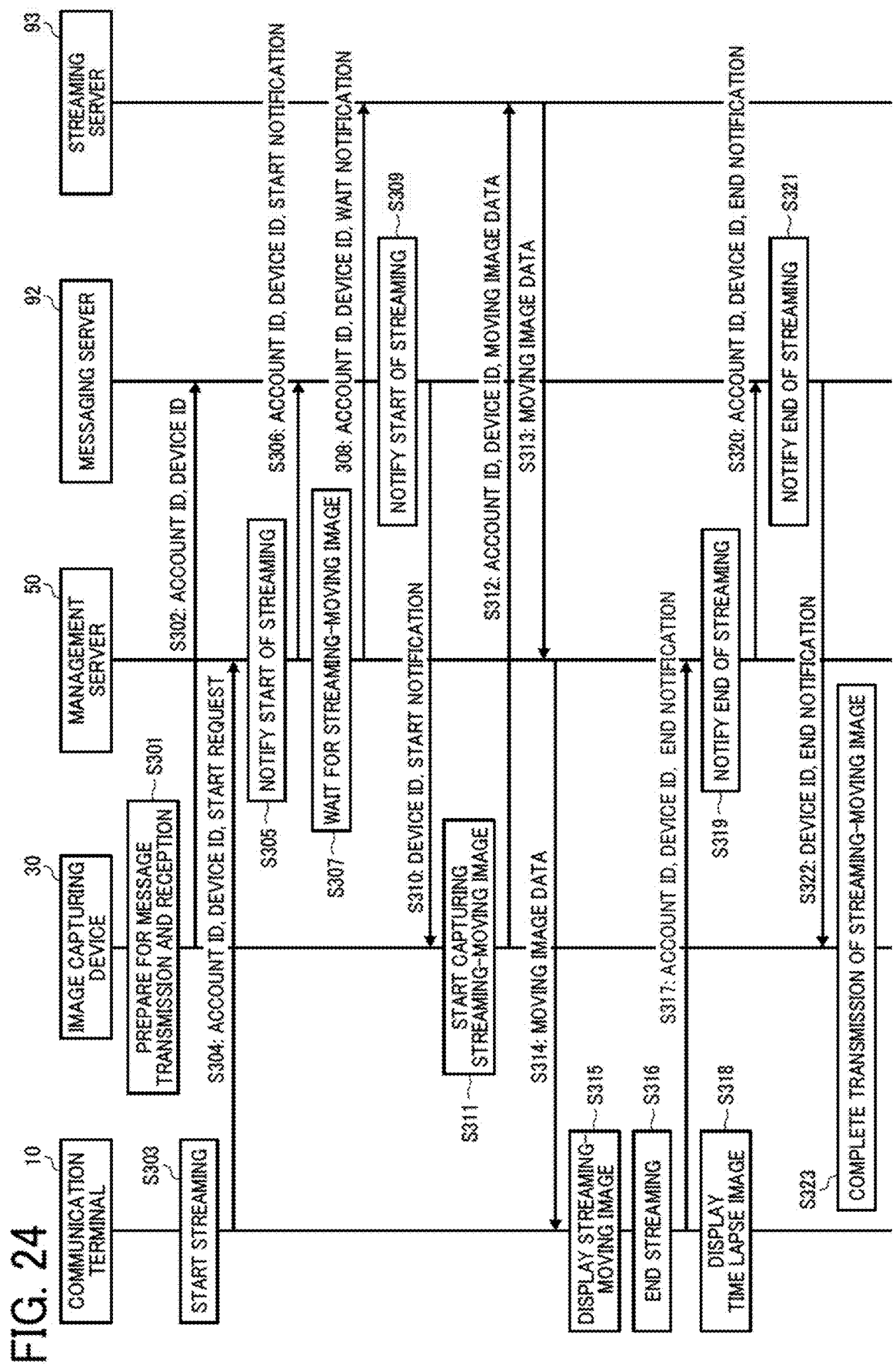
FIG. 24 is a sequence diagram illustrating an example of a streaming process according to the second variation of the exemplary embodiment.

FIG. 24 is a sequence diagram illustrating an example of a streaming process according to the second variation.

When the image capturing device 30 prepares to transmit or receive a message for managing streaming of a moving image by, for example, plugging a moving image capturing function into the imaging control unit 33 (step S301), the transmission/reception unit 31 of the image capturing device 30 transmits an account ID and a device ID to the messaging server 92, and the messaging server 92 registers the image capturing device 30 corresponding to the received device ID as a message waiting status (step S302).

As described with reference to FIG. 1, when the communication system 1 includes the plurality of image capturing devices 30, the messaging server 92 can register each of the plurality of image capturing devices 30 as a message waiting status.

In response to a user operation that is an input operation performed on an input screen, the reception unit 12 of the communication terminal 10 receives an input of a streaming start request for a specified image capturing device 30 (step S303). The transmission/reception unit 11 of the communication terminal 10 transmits, to the management server 50, the account ID and the device ID of the specified image capturing device 30 together with the streaming start request (step S304).

When the transmission/reception unit 51 of the management server 50 receives the streaming start request, the account ID, and the device ID transmitted from the communication terminal 10, the setting unit 54 of the management server 50 sets a streaming start notification (step S305), and the transmission/reception unit 51 transmits, to the messaging server 92, the streaming start notification, the account ID, and the device ID, which are received in step S305 (step S306).

The setting unit 54 of the management server 50 sets a streaming-moving image (video image) waiting notification (step S307), the transmission/reception unit 51 transmits, to the streaming server 93, the streaming-moving image waiting notification, the account ID, and the device ID, which are received in step S305, and then the streaming server 93 registers the image capturing device 30 associated with the received device ID (step S308).

When the device ID received in step S306 matches the device ID registered in step S302, the messaging server 92 sets a streaming start notification for the image capturing device 30 associated with the device ID (step S309), and transmits the streaming start notification and the device ID to the image capturing device 30 associated with the device ID (step S310).

When the transmission/reception unit 31 of the image capturing device 30 receives the streaming start notification from the messaging server 92, the imaging control unit 33 of the image capturing device 30 starts capturing image for a streaming-moving image (step S311). The transmission/reception unit 31 of the image capturing device 30 transmits the account ID and the device ID together with the moving image to the streaming server 93 (step S312).

When the device ID received in step S312 matches the device ID registered in step S308, the streaming server 93 transmits the moving image to the management server 50 (step S313).

When receiving the moving image from the streaming server 93, the transmission/reception unit 51 of the management server 50 transmits the moving image to the communication terminal 10 (step S314).

When the transmission/reception unit 11 of the communication terminal 10 receives the moving image transmitted from the management server 50, the display control unit 13 of the communication terminal 10 displays the received moving image on the display 106 (step S315).

After that, in response to a user operation that is an input operation performed on the input screen, the reception unit 12 of the communication terminal 10 receives an input of a streaming end request for the specified image capturing device 30 (step S316). The transmission/reception unit 11 of the communication terminal 10 transmits the account ID and the device ID of the specified image capturing devices 30 together with the streaming end notification to the management server 50 (step S317).

When the transmission/reception unit 51 of the management server 50 receives the streaming end request, the account ID, and the device ID transmitted from the communication terminal 10, the setting unit 54 of the management server 50 sets a streaming end notification (step S319), and the transmission/reception unit 51 transmits, to the messaging server 92, the streaming end notification, the account ID, and the device ID, which are received in step S317 (step S320).

When the device ID received in step S320 matches the device ID of the image capturing device 30 for which the streaming start notification has been set in step S309, the messaging server 92 sets a streaming end notification for the image capturing devices 30 associated with the device ID (step S321), and transmits the streaming end notification and the device ID to the image capturing devices 30 associated with the device ID (step S322).

When the transmission/reception unit 31 of the image capturing device 30 receives the streaming end notification, the imaging control unit 33 of the image capturing device 30 ends capturing the moving image, and the transmission/reception unit 31 of the image capturing device 30 ends transmitting the moving image to the streaming server 93 (step S323).

Figure 25:
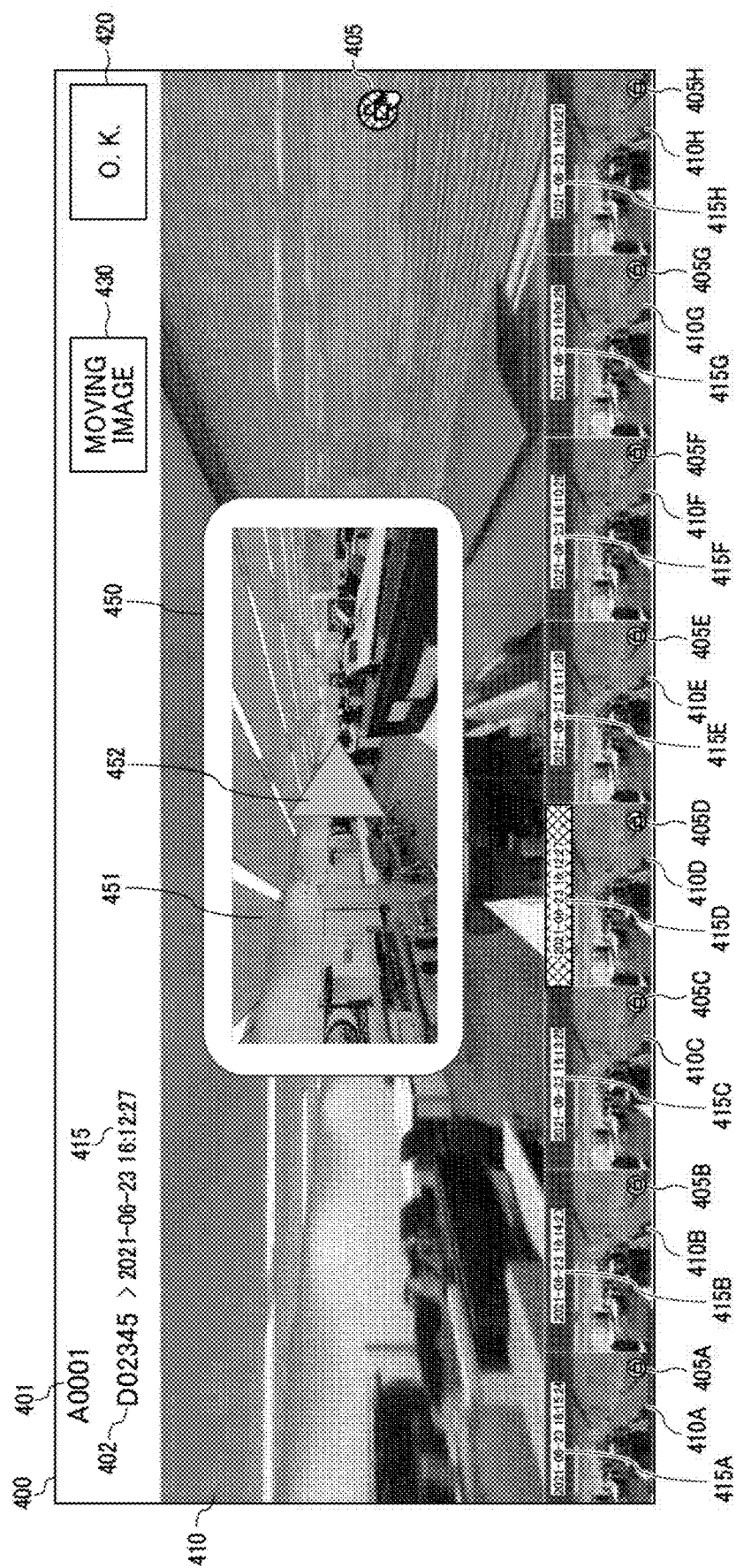
FIG. 25 is a diagram illustrating an example of an input screen according to the second variation of the exemplary embodiment.

FIG. 25 is a diagram illustrating an example of an input screen according to the second variation.

FIG. 25 is a diagram illustrating an example of an input screen corresponding to step S303 of the sequence diagram illustrated in FIG. 24.

The display control unit 13 of the communication terminal 10 displays the input screen 400 illustrated in FIG. 25 by adding a moving image button 430 and a moving image display window 450 to the input screen 400 illustrated in FIG. 19.

The moving image display window 450 includes a moving image display section 451 and a moving image start/stop button 452.

In response to a user operation performed with the moving image button 430, the reception unit 12 receives an operation instruction, and the display control unit 13 displays the moving image display window 450 on the input screen 400.

In response to a user operation performed with the moving image start/stop button 452, an input of a streaming start request to the image capturing device 30 identified by the device ID displayed in the device information 402 is received.

In step S315 of the sequence diagram illustrated in FIG. 24, the display control unit 13 causes the moving image display section 451 to display the moving image. In a case where an error occurs, for example, the specified image capturing device 30 fails to perform image capturing due to a power being off or being disconnected, the moving image button 430 displayed on the input screen 400 may be displayed with half brightness or grayed out, and the reception unit 12 may not receive an operation instruction even when the moving image button 430 is operated. In addition, in a case where an error in which image capturing is failed to be performed occurs, a notification, such as "Failed to start video image," notifying that an error has occurred may be displayed on the input screen 400.

Figure 26:
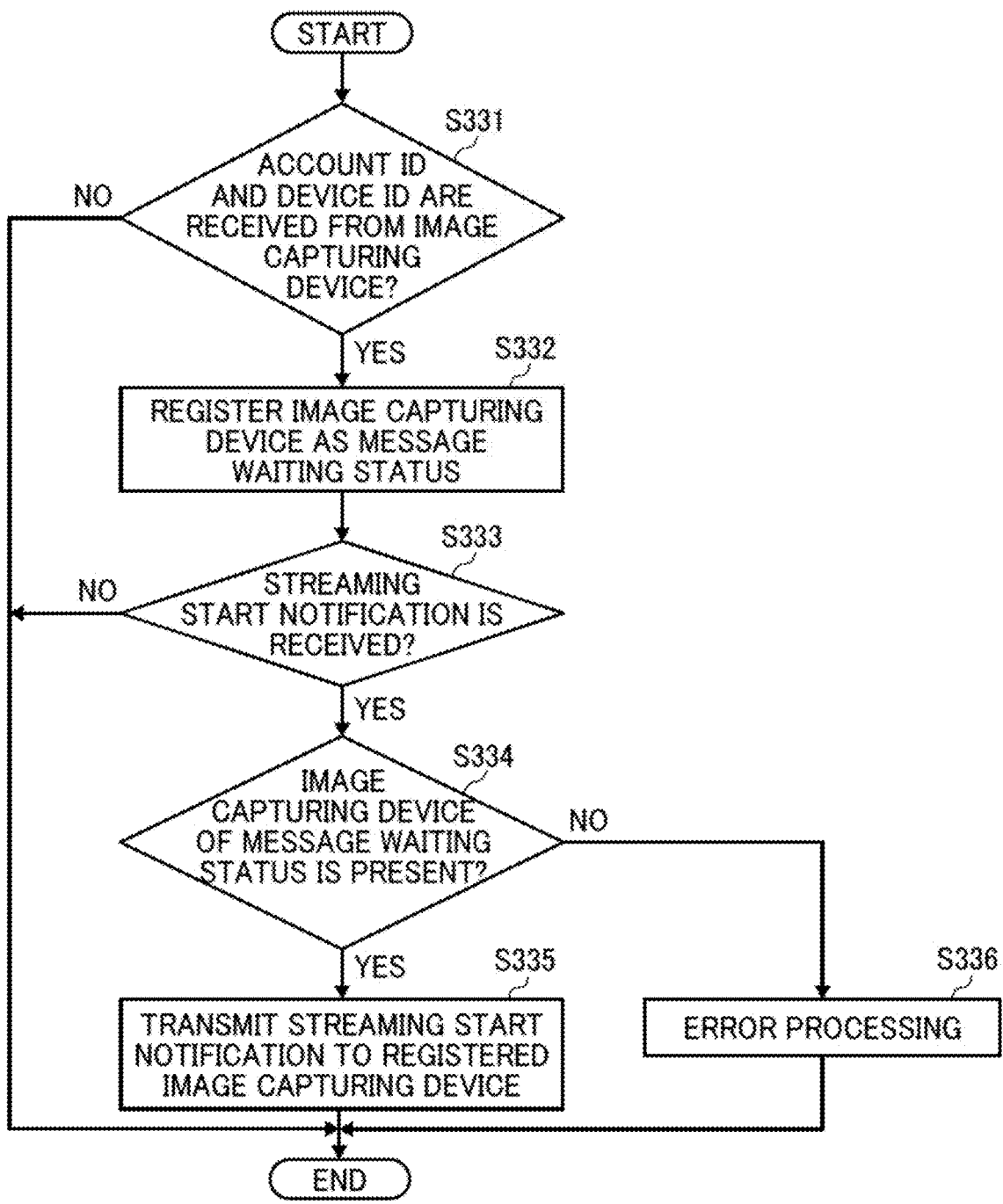
FIG. 26 is a flowchart illustrating a process performed by a messaging server according to the second variation of the exemplary embodiment.

FIG. 26 is a flowchart illustrating a process performed by the messaging server according to the second variation.

When receiving the account ID and the device ID from the image capturing device 30 (step S331), the messaging server 92 registers the image capturing device 30 corresponding to the received device ID as a message waiting status (step S332).

When the messaging server 92 receives the account ID and the device ID from the management server 50 (step S333), and when the received device ID matches the device ID of the image capturing device 30 registered as a message waiting status in step S332 (step S334), the messaging server 92 sets a streaming start notification for the image capturing device 30 corresponding to the device ID and transmits the streaming start notification to the image capturing device 30 corresponding to the device ID (step S335).

On the other hand, when the device ID received in step S333 does not match the device ID of the image capturing device 30 that is registered as a message waiting status in step S332, the messaging server 92 performs error processing to deal with the error, such as transmitting a notification to the communication terminal 10 via the management server 50 (step S336).

Figure 27:
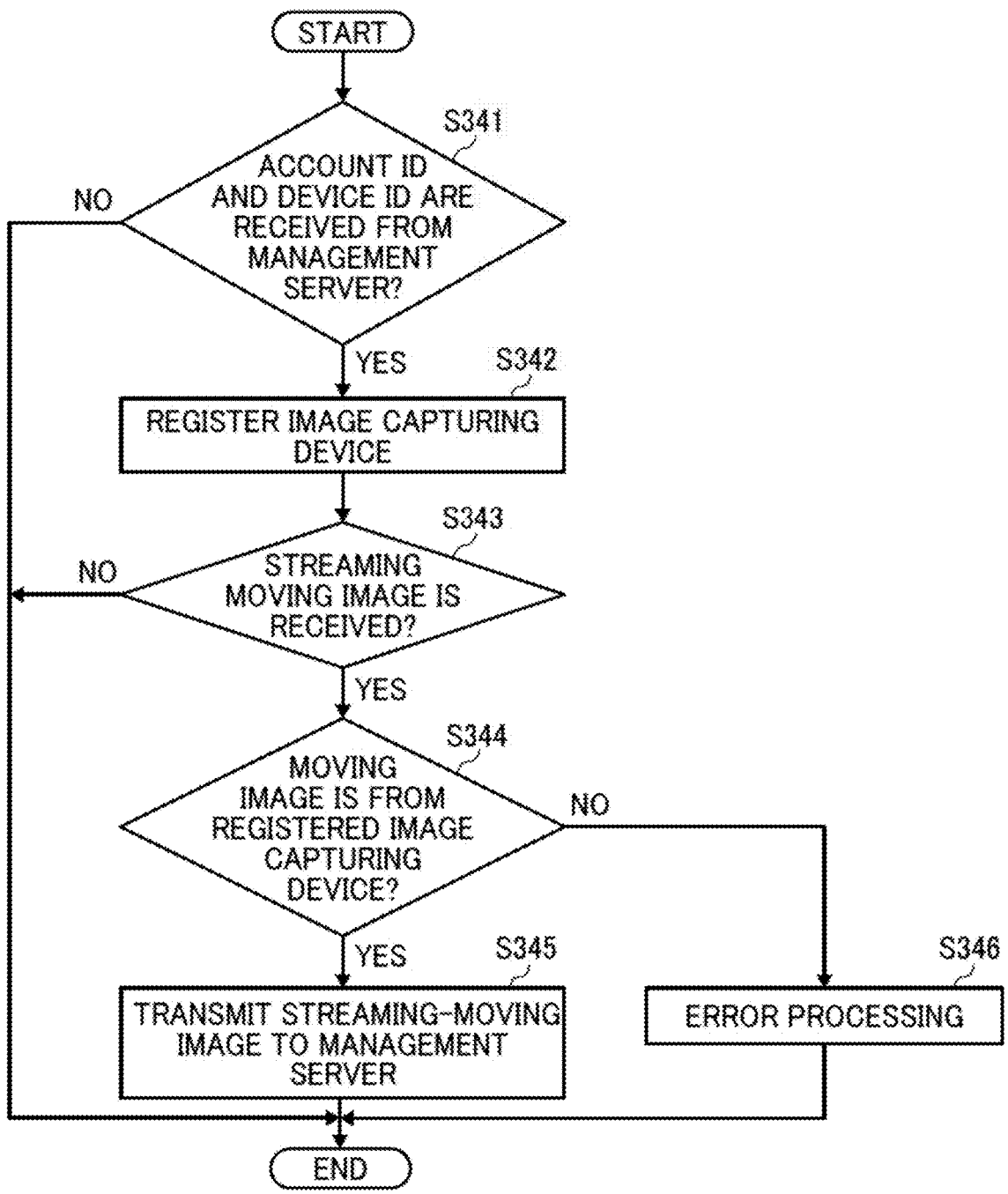
FIG. 27 is a flowchart illustrating a process performed by a streaming server according to the second variation of the exemplary embodiment.

FIG. 27 is a flowchart illustrating a process performed by the streaming server according to the second variation.

When receiving the account ID and the device ID from the management server 50 (step S341), the streaming server 93 registers the image capturing device 30 corresponding to the received device ID as a streaming-moving image waiting status (step S342).

When the streaming server 93 receives the moving image and the device ID from the image capturing device 30 (step S343), and when the received device ID matches the device ID of the image capturing device 30 registered in step S342 (step S344), the streaming server 93 transmits the moving image to the management server 50 (step S345).

On the other hand, when the device ID received in step S343 does not match the device ID of the image capturing devices 30 registered as a streaming-moving image waiting status in step S342, the streaming server 93 performs error processing to deal with the error, such as transmitting a notification to the communication terminal 10 via the management server 50 (step S346).

Figure 28:
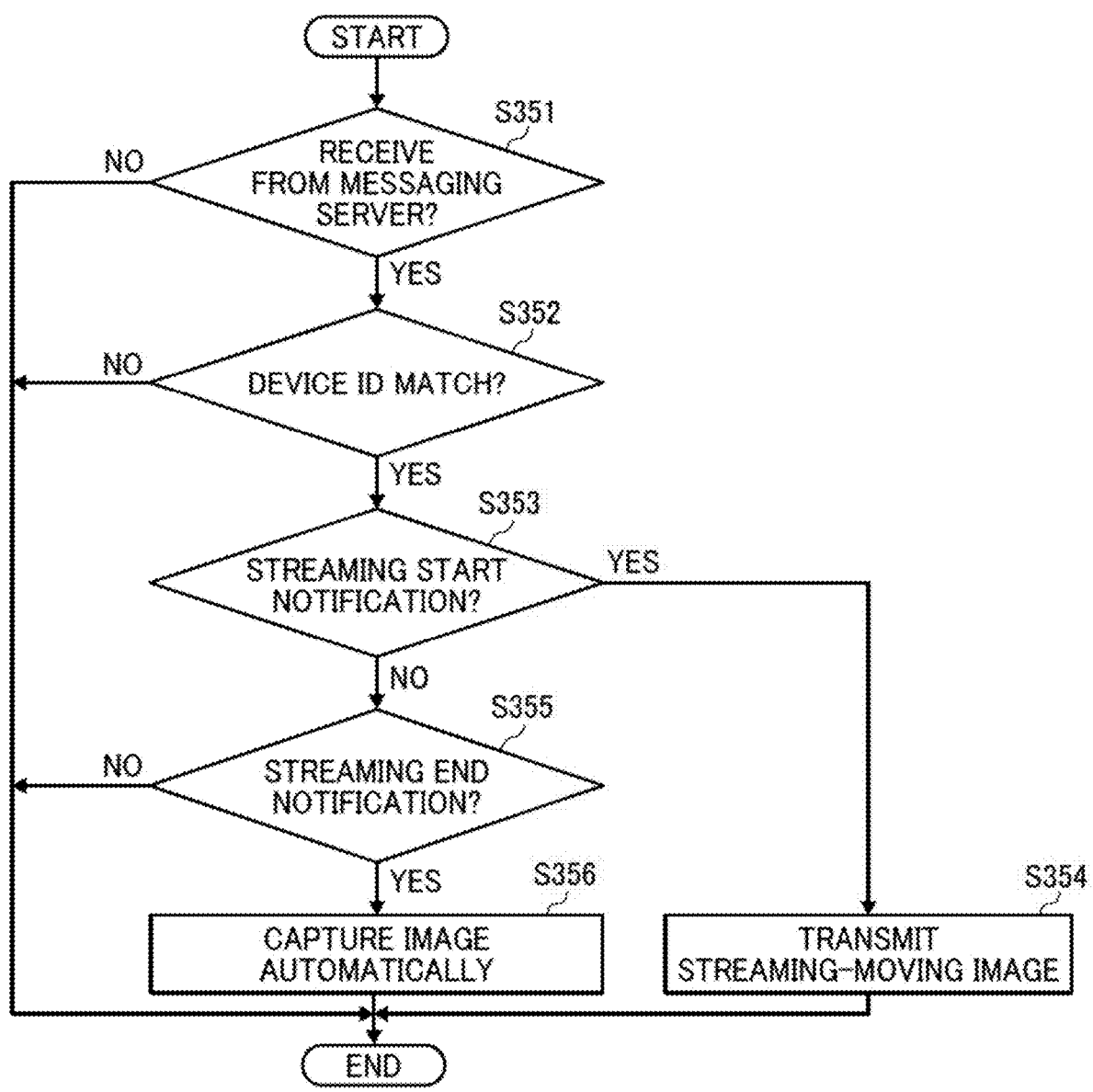
FIG. 28 is a flowchart illustrating a process performed by the image capturing device according to the second variation of the exemplary embodiment.

FIG. 28 is a flowchart illustrating a process performed by the image capturing device according to the second variation.

When the transmission/reception unit 31 of the image capturing device 30 receives the notification from the messaging server 92 (step S351), when the device ID received from the messaging server 92 matches the device ID of the image capturing device 30 (step S352), and when the received message is a streaming start notification (step S353), the imaging control unit 33 of the image capturing device 30 starts capturing a streaming-moving image, and the transmission/reception unit 31 transmits moving image data to the streaming server 93 (step S354).

On the other hand, when the received message is the streaming end notification (step S355), the imaging control unit 33 of the image capturing device 30 ends capturing the streaming-moving image and automatically resumes image capturing of a time-lapse image (step S356).

Figure 29:
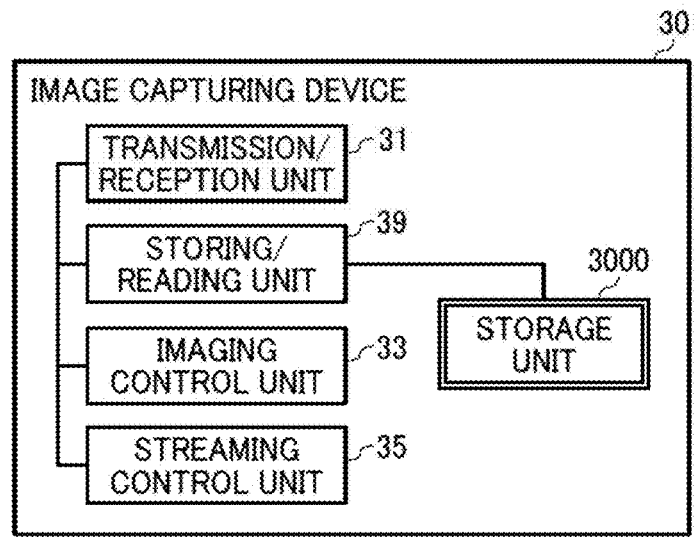
FIG. 29 is a block diagram illustrating an example of a functional configuration of an image capturing device in a communication system according to a third variation of the exemplary embodiment.

Third Variation:

FIG. 29 is a block diagram illustrating an example of a functional configuration of an image capturing device in a communication system according to a third variation of the above-described embodiment.

A streaming control unit 35 having a moving image capturing function is plugged into the image capturing device 30 of the communication system 1 illustrated in FIG.

29, which is different from the image capturing device 30 of the communication system 1 illustrated in FIG. 5.

The streaming control unit 35 executes a part of the processing executed by the imaging control unit 33 according to the second variation.

Figure 30:
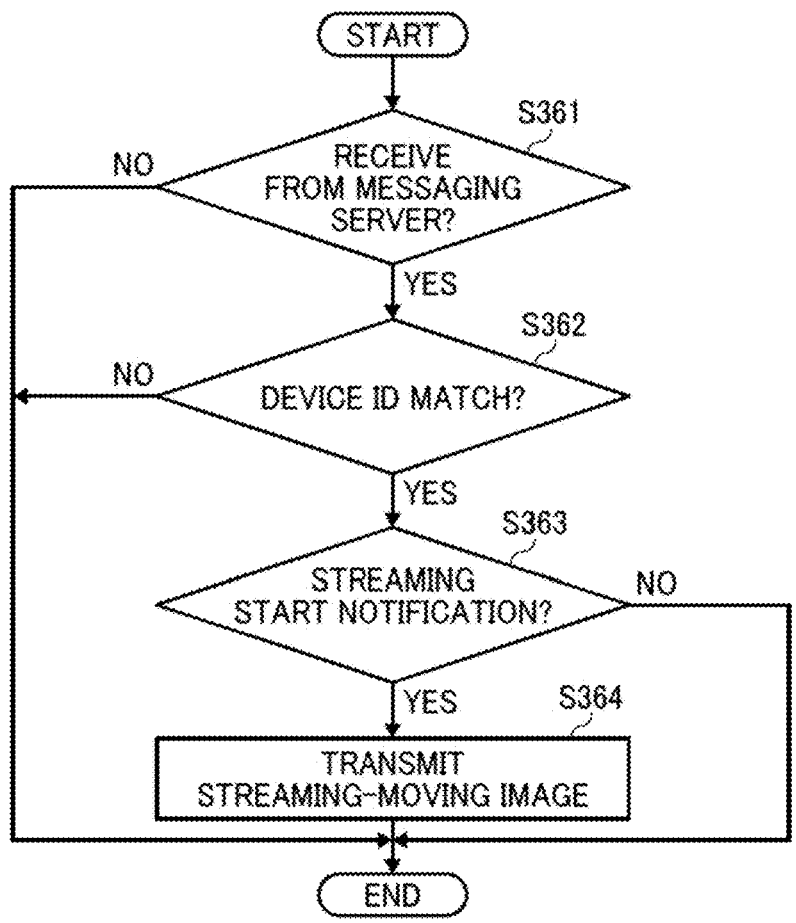
FIG. 30 is a flowchart illustrating a process performed by the image capturing device according to the third variation of the exemplary embodiment.

FIG. 30 is a flowchart illustrating a process performed by the image capturing device according to the third variation.

When the transmission/reception unit 31 of the image capturing device 30 receives the notification from the messaging server 92 (step S361), when the device ID received from the messaging server 92 matches the device ID of the image capturing device 30 (step S362), and when the received message is a streaming start notification (step S363), the streaming control unit 35 of the image capturing device 30 starts capturing a streaming-moving image, and the transmission/reception unit 31 transmits moving image data to the streaming server 93 (step S364).

FIG. 31 is a flowchart illustrating another process performed by the image capturing device according to the third variation.

When the transmission/reception unit 31 of the image capturing device 30 receives the notification from the messaging server 92 (step S371), when the device ID received from the messaging server 92 matches the device ID of the image capturing device 30 (step S372), and when the received message is a streaming end notification (step S373), the imaging control unit 33 of the image capturing device 30 ends capturing the streaming-moving image and resume automatically capturing a time-lapse image (step S374).

A time-lapse image capturing function is plugged into the image capturing device 30 so that the time-lapse image capturing according to the above-described embodiment can be executed. In this case, the relationship between the time-lapse image capturing function plug-in and the moving image streaming function plug-in, which is described in the second and third variations, is described below.

In the image capturing device 30 in a status of capturing a time-lapse image, the time-lapse image capturing function plug-in is activated (enabled). In response to receiving a streaming start notification, the image capturing device 30 switches the plug-in to be activated (enabled) to activate the moving image streaming function plug-in. After that, in response to receiving a streaming end notification, the image capturing device 30 switches the plug-in to be activated (enabled) to activate the time-lapse image capturing function plug-in.

As described above, when each of the different functions such as the time-lapse image capturing function and the moving image streaming function is to be executed based on content of the received notification, the image capturing device 30 switches the activated plug-in to make a desired function be available.

Note that each of the time-lapse image capturing function plug-in and the moving image streaming function plug-in may be an independent plug-in, or the time-lapse image capturing function plug-in and the moving image streaming function plug-in may be combined (included) in a single plug-in.

The control for switching the plug-in by the image capturing device 30 is not limited to the two plug-ins of the time-lapse imaging function plug-in and the moving image streaming function plug-in. Another example of plug-in may include an update plug-in that checks whether a version of each plug-in installed on the image capturing device 30 is the latest version.

In this case, after the image capturing device 30 is powered on, the update plug-in is activated, and an inquiry is made to a predetermined server as to whether the plug-in installed on the image capturing device 30 is the latest one. When the latest version is present as a result of the inquiry, the latest plug-in is downloaded from a predetermined server and installed. After that, the plug-in is switched to a plug-in related to an image capturing function such as the time-lapse image capturing function plug-in or the moving image streaming function plug-in.

Further, the update plug-in can also be applied to a case where the plug-in is used as a single-function plug-in for the time-lapse image capturing function or the moving image streaming function. In other words, update of the time-lapse image capturing function plug-in is checked by the update plug-in, and then the time-lapse plug-in is activated, or update of the moving image streaming function plug-in is checked by the update plug-in, and then the moving image streaming function plug-in is activated. As described, the update plug-in is used as a single function plug-in.

As described above, it is possible to temporarily check a streaming moving image even during time-lapse images are being captured, which is set once, and this is effective in a case where a situation of a site is desired to be quickly checked in real time, for example, in a case of an earthquake.

In addition, a maximum browsing time (time limit) of a predetermined time may be set for a streaming moving image. For example, when the maximum browsing time is set to 5 minutes, after 5 minutes has passed since a start of streaming a moving image, the process automatically returns to capturing time-lapse images.

This prevents failing to capture time-lapse images when a user forgets to end streaming a moving image by mistake after browsing a streaming-moving image.

In addition, when the longest browsing time is set for a streaming moving image, a time of browsing may be displayed on the input screen 400, or a remaining time may be displayed in a countdown manner on the input screen 400.

As described above, the management server 50, which is an example of an information processing device according to one of the embodiments of the disclosure, includes the setting unit 54, which is an example of a setting unit, to set an image, which is an example of data stored in the second external storage 91, which is an example of the storage unit or the second external storage unit, as one to be deleted from the second external storage 91 in a case that a predetermined condition is satisfied, and the transmission/reception unit 51, which is an example of a transmission unit, to transmit, to the communication terminal 10, input screen information related to the input screen 400 for inputting information for setting an image as one to be excluded from images to be deleted. The setting unit 54 sets the image as the one to be excluded from the images to be deleted according to an operation received via the input screen 400 displayed on the communication terminal 10 based on the input screen information.

Accordingly, an image can be stored in the second external storage 91 until the predetermined condition is satisfied, and an image to be deleted from the second external storage 91 after the predetermined condition is satisfied and an image to be continuously stored in the second external storage 91 after the predetermined condition is satisfied can be reserved before the predetermined condition is satisfied.

In other words, an image desired by a user to be stored is prevented from being deleted without the user noticing, and deletion and storage of an image is appropriately performable.

The data stored in the second external storage 91 is not limited to a still image, and may be a moving image, or may be measurement data, such as vibration waveform data measured by a vibration sensor or three dimensional distance data measured by laser imaging detection and ranging (LIDAR), for example.

In addition, the image stored in the second external storage 91 may be one transmitted from a device that is different from the communication terminal 10, or may be transmitted from the communication terminal 10.

The setting unit 54 sets an image, which is an example of measurement data, transmitted from the image capturing device 30, which is an example of a measurement device, and stored in the second external storage 91, as the one to be deleted from the second external storage 91, in the case that the predetermined condition is satisfied.

In this case, the image captured by the image capturing device 30 is often stored in the second external storage 91 without being checked by the user. However, in the present embodiment, the user can reserve, before the predetermined condition is satisfied, an image to be deleted from the second external storage 91 after the predetermined condition is satisfied and an image to be continuously stored in the second external storage 91 after the predetermined condition is satisfied, by using the input screen 400.

The measurement device, which is an example of the image capturing device 30, and the communication terminal 10 may be implemented by a single entity.

The setting unit 54 sets the image stored in the second external storage 91 as the one to be deleted from the second external storage 91 in a case that a predetermined period has elapsed from a time at which the image is captured, which is an example of the case that the predetermined condition is satisfied. The predetermined period may be set by the user or a service provider in advance.

Accordingly, an image can be stored in the second external storage 91 until the predetermined period elapses, and an image to be deleted from the second external storage 91 after the predetermined period elapses or an image to be continuously stored in the second external storage 91 after the predetermined period elapses can be reserved before the predetermined period elapses.

The setting unit 54 may set the image stored in the second external storage 91 as the one to be deleted from the second external storage 91 in a case that the number of images stored in the second external storage 91 exceeds a predetermined amount (for example, 5000 images), which is another example of the case that the predetermined condition is satisfied. In this case, the images are deleted in ascending order (from the oldest) of image capturing times (date and time).

The setting unit 54 sets an image that is automatically captured by the image capturing device 30 in a predetermined image capturing mode, transmitted from the image capturing device 30, and stored in the second external storage 91 as the one to be deleted.

In this case, the image is often stored in the second external storage 91 without being checked by the user. However, in the present embodiment, the user can reserve, before the predetermined condition is satisfied, an image to be deleted from the second external storage 91 after the predetermined condition is satisfied and an image to be continuously stored in the second external storage 91 after the predetermined condition is satisfied, by using the input screen 400.

The transmission/reception unit 51 transmits, to the communication terminal 10, a moving image that is automatically captured by the image capturing device 30 and is not stored in the second external storage 91.

The transmission/reception unit 51 does not transmit the input screen information, in other words, suspends transmission of the input screen information, to the communication terminal 10 during transmission of the moving image.

The setting unit 54 does not set, as the one to be deleted, an image that is manually captured by the image capturing device 30, transmitted from the image capturing device 30, and stored in the first external storage 90, which is an example of the storage unit and the first storage unit.

The setting unit 54 does not set, as the one to be deleted, an image that is manually captured by another image capturing device that is different from the image capturing device 30, transmitted from the different image capturing device, and stored in the first external storage 90.

The setting unit 54 sets an image to be excluded from the images to be deleted within a predetermined amount range of a total amount of an amount (first amount) corresponding to images that are manually captured and stored in the first external storage 90 and an amount corresponding (second amount) to images that are to be excluded from the images to be deleted.

Accordingly, even when an amount range having an upper limit such as the maximum number of images that can be stored is set for storing images in the second external storage 91 and the first external storage 90, setting an image as the one to be excluded from the images to be deleted is appropriately performable. Note that the amount of images and the predetermined amount may be corresponding to the number of images or the capacity.

When the total amount reaches the maximum number of images that can be stored, which is an example of the upper limit of the predetermined amount range, the transmission/reception unit 51 transmits, to the communication terminal 10, notification information indicating that an image manually captured is not to be saved and/or an image is not to be set as one to be excluded from the images to be deleted. In other words, the notification information indicates at least one of that storing the image manually captured is to be failed or that setting the image as the one to be excluded from the images to be deleted is to be failed.

When the total amount reaches the maximum number of images that can be stored, the transmission/reception unit 51 transmits, to the communication terminal 10, information to increase the maximum number of images that can be stored.

The setting unit 54 sets the image stored in the second external storage 91 as the one to be deleted in association with account information transmitted from the image capturing device 30, and the transmission/reception unit 51 transmits the input screen information, which is related to the input screen 400, including the account information.

Accordingly, even when an image is to be set as the one to be deleted for each account represented by the account information, an image to be deleted from the second external storage 91 after the predetermined condition is satisfied and an image to be continuously stored in the second external storage 91 after the predetermined condition is satisfied can be reserved for each account represented by the account information before the predetermined condition is satisfied.

In a case where the account information transmitted from the image capturing device 30 matches one registered in advance, the setting unit 54 sets the image stored in the second external storage 91 as the one to be deleted in association with the account information.

Accordingly, an image is set as one to be deleted for each account represented by the account information.

In a case where a combination of the account information and identification information identifying the image capturing device 30 that are transmitted from the image capturing device 30 matches one registered in advance, the setting unit 54 sets the image stored in the second external storage 91 as the one to be deleted in association with the account information.

Accordingly, the image transmitted from the image capturing device 30 identified by the identification information stored in association with the account information in advance is to be set as the one to be deleted.

An information processing method according to one of the embodiments of the present disclosure includes setting an image being an example of data transmitted from the image capturing device 30 being an example of a measurement device and stored in the second external storage 91 being an example of a storage unit as one to be deleted from the second external storage 91 in a case that a predetermined condition is satisfied, and displaying the input screen 400 for inputting information for setting an image to be excluded from the images to be deleted. The setting includes setting an image to be excluded from the images to be deleted according to an operation received via the input screen 400 displayed.

The information processing method further includes transmitting, to the communication terminal 10, input screen information related to the input screen 400 for inputting the information for setting an image as the one to be excluded from the images to be deleted, and the setting includes setting the image as the one to be excluded from the images to be deleted according to the operation received via the input screen 400 displayed on the communication terminal 10 based on the transmitted input screen information.

An information processing system according to one of the embodiments of the disclosure includes the image capturing device 30, an information processing device communicably connected to the image capturing device 30, and the communication terminal 10 communicably connected to the information processing device. The information processing device includes the setting unit 54 to set an image transmitted from the image capturing device 30 and stored in the second external storage 91 as one to be deleted from the second external storage 91 in a case that a predetermined condition is satisfied, and the transmission/reception unit 51 to transmit, to the communication terminal 10, input screen information related to the input screen 400 for inputting information for setting an image to be excluded from images to be deleted. The setting unit 54 sets an image to be excluded from the images to be deleted according to an operation received via the input screen 400 displayed on the communication terminal 10 based on the input screen information.

The management server 50 according to one of the embodiments of the disclosure includes the setting unit 54 to set data stored in the second external storage 91 as one to be deleted from the second external storage 91 in a case that a predetermined condition is satisfied, and the setting unit 54 sets data as one to be excluded from the data to be deleted according to an operation received via the input screen 400 for inputting information for setting data as the one to be excluded from the data to be deleted.

In this case, the input screen 400 may be configured and displayed by the communication terminal 10, or may be configured and displayed by the management server 50.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), system on a chip (SOC), graphics processing unit (GPU), and conventional circuit components arranged to perform the recited functions. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

Each of the tables of the above-described embodiments may be generated by learning effect of machine learning. In addition, in alternative to using the tables, the data of each related item may be classified by the machine learning. In the present disclosure, the machine learning is defined as a technology that makes a computer to acquire human-like learning ability. In addition, the machine learning refers to a technology in which a computer autonomously generates an algorithm for determination such as data identification from learning data loaded in advance and applies the generated algorithm to new data to make a prediction. Any suitable learning method is applied for the machine learning, for example, any one of supervised learning, unsupervised learning, semi-supervised learning, reinforcement learning, and deep learning, or a combination of two or more of these learning.

Although the information processing device, the information processing method, the program, and the information processing system according to embodiments of the present disclosure have been described above, the above-described embodiments are illustrative and do not limit the present invention. The above-described embodiments of the present disclosure may be modified within a range that can be conceived by those skilled in the art. The modification includes additions of other embodiments, modifications, and deletions. The modifications are included in the scope of the present disclosure as long as the actions and effects of the present disclosure are provided.

An according to an embodiment of the present disclosure, an information processing device, an information processing method, and an information processing program that appropriately deletes or stores data.

Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The invention claimed is:

1. An information processing device, comprising circuitry configured to:
set one or more images transmitted from an image capturing device and stored in a memory, as ones to be deleted from the memory in a case that a condition is satisfied;
transmit, to a communication terminal, input screen information related to an input screen for inputting information for setting one of the one or more images as one to be excluded from the images to be deleted; and
set the one of the one or more images as the one to be excluded from the images to be deleted according to an operation received via the input screen displayed on the communication terminal based on the input screen information, wherein the circuity is further configured to set the one of the one or more images as the one to be excluded from the images to be deleted, such that a total amount of a first amount and a second amount is within a predetermined amount range, the first amount being corresponding to images that are manually captured and stored in the memory, the second amount being corresponding to images to be excluded from the images to be deleted.

2. The information processing device of claim 1, wherein the case that the condition is satisfied includes that a predetermined period has elapsed from a time at which each of the one or more images stored in the memory is captured.

3. The information processing device of claim 1, wherein each of the one or more images set as the ones to be deleted is automatically captured by the image capturing device.

4. The information processing device of claim 3, wherein each of the one or more images set as the ones to be deleted is other than an image that is manually captured by the image capturing device.

5. The information processing device of claim 3, wherein each of the one or more images set as the ones to be deleted is other than another image that is manually captured by another image capturing device, transmitted from the another image capturing device, and stored in the memory.

6. The information processing device of claim 1, wherein the circuitry transmits, to the communication terminal, a moving image that is automatically captured by the image capturing device.

7. The information processing device of claim 6, wherein the circuitry suspends transmitting the input screen information to the communication terminal while transmitting the moving image.

8. The information processing device of claim 1, wherein, in a case that the total amount reaches an upper limit of the predetermined amount range,
the circuitry transmits, to the communication terminal, notification information indicating at least one of that storing the image manually captured is to be failed or that setting the one of the one or more images as the one to be excluded from the images to be deleted is to be failed.

9. The information processing device of claim 1, wherein in a case that the total amount reaches an upper limit of the predetermined amount range,
the circuitry transmits, to the communication terminal, information to increase the upper limit of the predetermined amount range.

10. The information processing device of claim 1, wherein
the circuitry
sets the one or more images stored in the memory as the ones to be deleted, in association with account information transmitted from the image capturing device, and
transmits, to the communication terminal, the input screen information including the account information.

11. The information processing device of claim 10, wherein,
in a case that the account information transmitted from the image capturing device matches one registered in advance, the circuitry sets the one or more images stored in the memory as the ones to be deleted, in association with the account information.

12. The information processing device of claim 11, wherein,
in a case that a combination of the account information and identification information identifying the image capturing device that are transmitted from the image capturing device matches one registered in advance, the circuitry sets the one or more images stored in the memory as the ones to be deleted, in association with the account information.

13. An information processing method, comprising:
setting one or more images transmitted from an image capturing device and stored in a memory as ones to be deleted from the memory in a case that a condition is satisfied;
transmitting, to a communication terminal, input screen information related to an input screen for inputting information for setting one of the one or more images as one to be excluded from the images to be deleted;
setting the one of the one or more images as the one to be excluded from the images to be deleted according to an operation received via the input screen displayed on the communication terminal based on the input screen information; and
setting the one of the one or more images as the one to be excluded from the images to be deleted, such that a total amount of a first amount and a second amount is within a predetermined amount range, the first amount being corresponding to images that are manually captured and stored in the memory, the second amount being corresponding to images to be excluded from the images to be deleted.

14. A non-transitory recording medium storing a plurality of instructions which, when executed by one or more processors, causes the processors to perform a method, the method comprising:
setting one or more images transmitted from an image capturing device and stored in a memory as ones to be deleted from the memory in a case that a condition is satisfied;
transmitting, to a communication terminal, input screen information related to an input screen for inputting information for setting one of the one or more images as one to be excluded from the images to be deleted;
setting the one of the one or more images as the one to be excluded from the images to be deleted according to an operation received via the input screen displayed on the communication terminal based on the input screen information; and
setting the one of the one or more images as the one to be excluded from the images to be deleted, such that a total amount of a first amount and a second amount is within a predetermined amount range, the first amount being corresponding to images that are manually captured and stored in the memory, the second amount being corresponding to images to be excluded from the images to be deleted.

* * * * *